United States Patent
Brand et al.

(10) Patent No.: US 10,044,920 B2
(45) Date of Patent: Aug. 7, 2018

(54) RETRACTABLE IMAGE CAPTURE DEVICES AND METHODS TO PROTECT SUCH RETRACTABLE IMAGE CAPTURE DEVICES

(71) Applicant: Intel Corporation, Santa Clara, CA (US)

(72) Inventors: Jason M. Brand, Placerville, CA (US); Aleksander Magi, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/279,416

(22) Filed: Sep. 28, 2016

(65) Prior Publication Data

US 2018/0091716 A1    Mar. 29, 2018

(51) Int. Cl.
*H04N 5/232* (2006.01)
*H04N 5/225* (2006.01)
*H04N 7/18* (2006.01)

(52) U.S. Cl.
CPC ........... *H04N 5/232* (2013.01); *H04N 5/2252* (2013.01); *H04N 5/2254* (2013.01); *H04N 5/2257* (2013.01); *H04N 7/188* (2013.01)

(58) Field of Classification Search
CPC ...... H04N 5/232; H04N 7/188; H04N 5/2254; H04N 5/2252; H04N 5/2257
See application file for complete search history.

(56) References Cited

U.S. PATENT DOCUMENTS 8,010,154 B2 *   8/2011   Chambers ........... H04M 1/0264
                                                        455/556.1
8,922,625 B2 * 12/2014   Kim ........................ G03B 35/10
                                                        348/47
2006/0068722 A1   3/2006   Ashman, Jr.
2006/0285837 A1 * 12/2006  Mashima ............. H04N 5/2259
                                                        396/55
2015/0172520 A1   6/2015   Lindman et al.

FOREIGN PATENT DOCUMENTS

| JP | 2004229327   | 8/2004  |
| KR | 20070092202  | 9/2007  |
| KR | 20140140855  | 12/2014 |

OTHER PUBLICATIONS

International Searching Authority, "International Search Report," issued in connection with PCT Application No. PCT/US2017/047207, dated Nov. 14, 2017, 3 pages.

International Searching Authority, "Written Opinion," issued in connection with PCT Application No. PCT/US2017/047207, dated Nov. 14, 2017, 9 pages.

* cited by examiner

*Primary Examiner* — Padma Haliyur
(74) *Attorney, Agent, or Firm* — Hanley, Flight & Zimmerman, LLC

(57) ABSTRACT

Retractable image capture devices and methods to protect such retractable image capture devices. An example mobile device includes a housing; a camera module including a sensor and a lens, a focal distance between the sensor and the lens being fixed, the camera module being movably mounted to the housing to move between a first position and a second position, a surface of the lens to extend past an exterior surface of the housing in the first position, the camera module to be disposed within the housing in the second position; and an actuator to actuate the camera module from the first position to the second position in response to a proximity trigger.

24 Claims, 20 Drawing Sheets

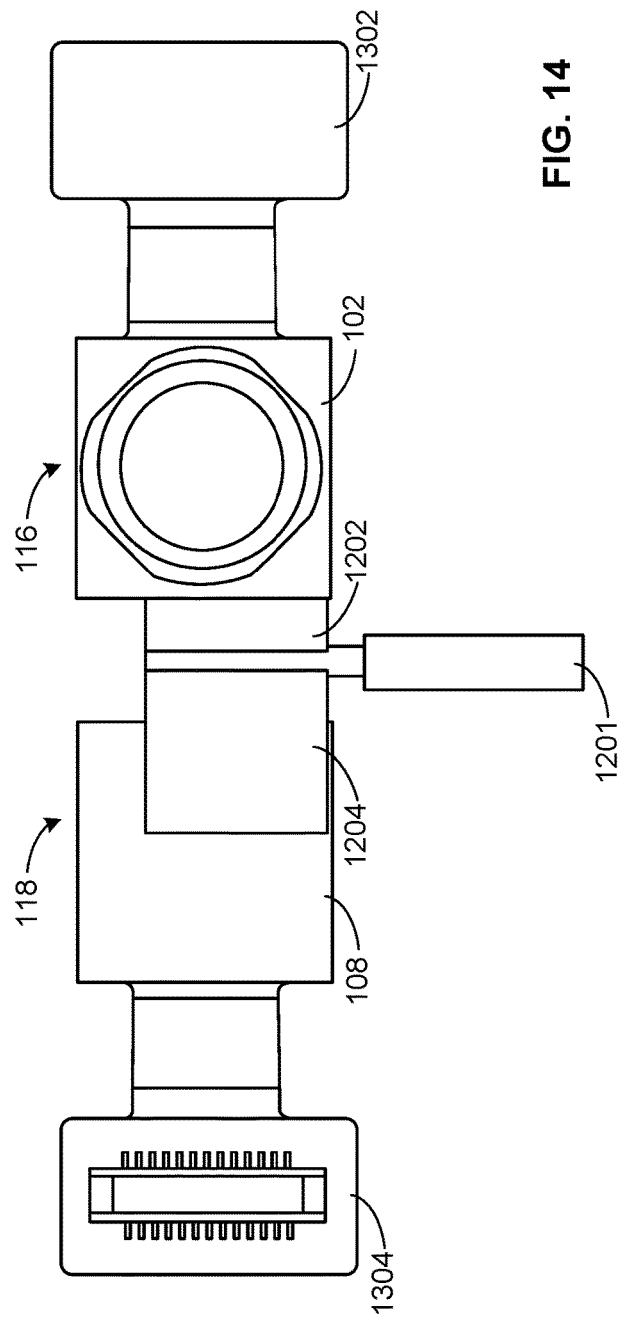

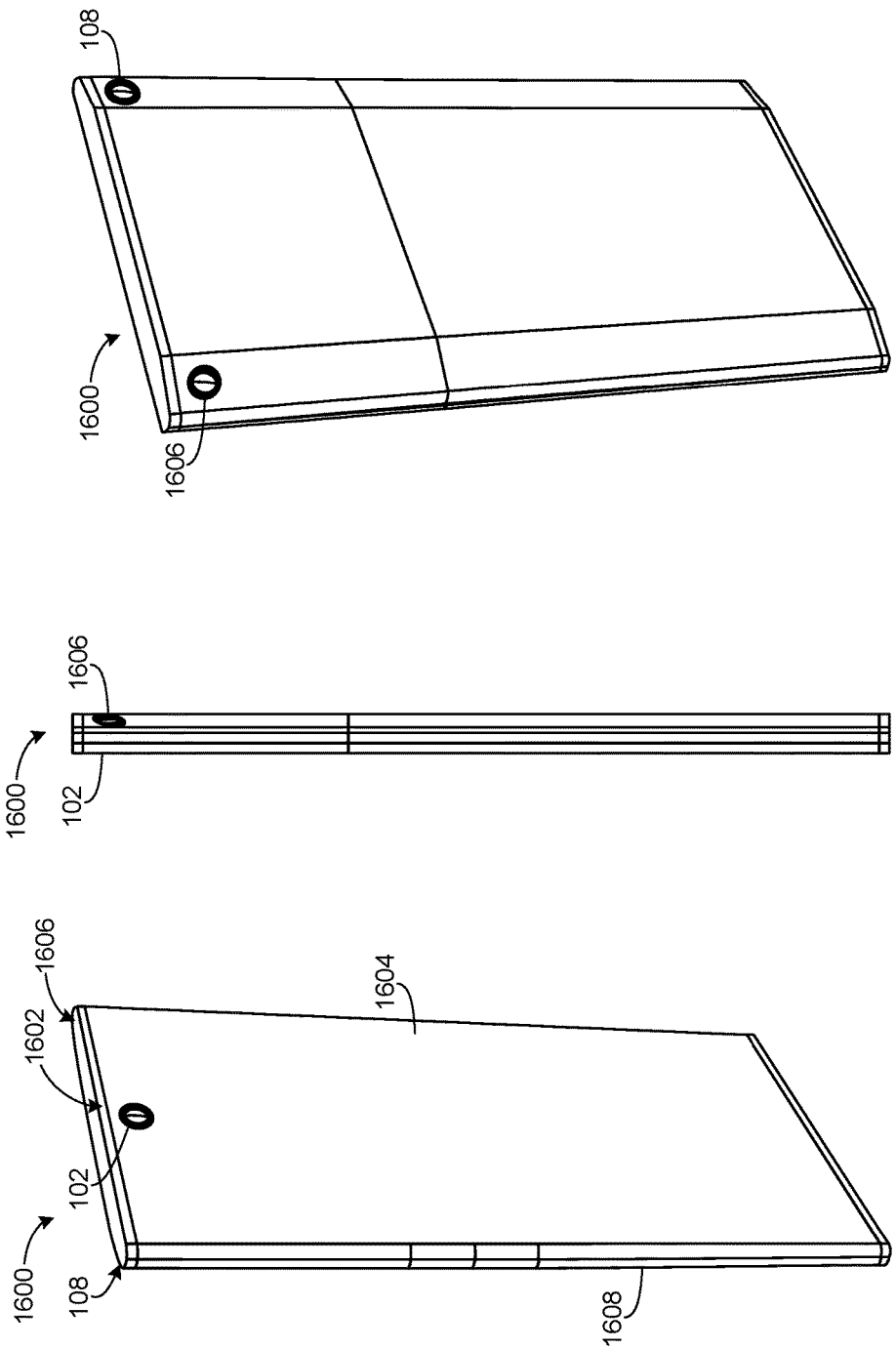

RETRACTABLE IMAGE CAPTURE DEVICES AND METHODS TO PROTECT SUCH RETRACTABLE IMAGE CAPTURE DEVICES

FIELD OF THE DISCLOSURE

This disclosure relates generally to retractable image capture devices, and, more particularly, to retractable image capture devices and methods to protect such retractable image capture devices.

BACKGROUND

Point and shoot cameras sometimes include a lens which may be extended out of a housing for photo taking and retracted into the housing when the camera is not in use. Mobile phones often include a camera to take pictures and/or video.

BRIEF DESCRIPTION OF THE DRAWINGS

FIG. 14 is a side view of the example image capture device of FIG. 11.

FIG. 15 is an isometric view of an example mobile device implemented with an example image capture device.

FIG. 16 is a side view of the example mobile device of FIG. 15.

FIG. 17 is an isometric view of the example mobile device of FIG. 15, but shows the opposite side of the device of FIG. 15.

The figures are not to scale. Wherever possible, the same reference numbers will be used throughout the drawing(s) and accompanying written description to refer to the same or like parts.

DETAILED DESCRIPTION

Figure 1:
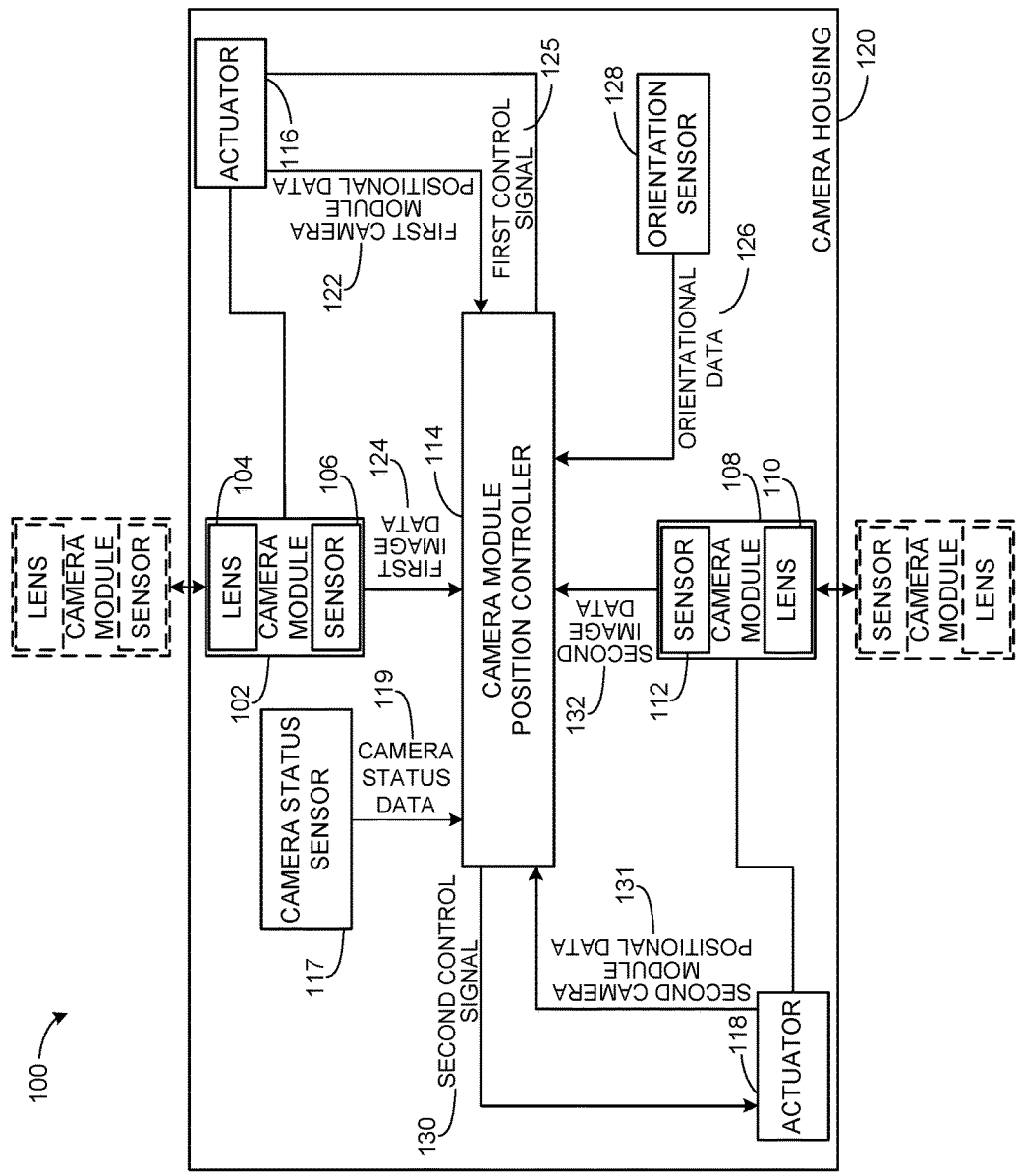
FIG. 1 is a schematic illustration of an example image capture device constructed in accordance with the teachings disclosed herein.

Examples disclosed herein relate to retractable image capture devices that include one or more camera module(s) (e.g., lens and/or image sensors) that move between an extended position and a retracted position when the camera module(s) are not being used and/or when an event and/or trigger is detected. The trigger(s) and/or event(s) may include identifying when an object (e.g., a table, the floor, carpet) in the environment of use becomes immediately adjacent and/or close to a lens of one of the camera modules and/or when the camera module has been exposed to a vibration and/or force meeting a threshold and/or indicating that the camera module has engaged an object and/or has been dropped. Such trigger(s) and/or event(s) may be detected by the image sensor of the camera module and may automatically cause retraction of the camera modules to thereby reduce the likelihood of damage due to contact with the object. The camera module(s) may be actuated in any suitable way such as, for example, using a voice-coil(s), a dual voice-coil, a dual spring, a rotary actuator(s), a leaf spring(s), a linear actuator(s), a micro-linear actuator(s), a solenoid actuator(s), a Piezo electric actuator(s), a spring(s), etc.

In some examples, an object is identified as being immediately adjacent a lens of an example camera module when a threshold difference is present between a first parameter value (e.g., a first luminosity, brightness or intensity value) sensed by a first one of the camera modules and a second parameter value (e.g., a second luminosity, brightness or intensity value) sensed by a second one of the camera modules. For instance, a sufficiently large difference in luminosity may indicate that a mobile device having a first camera module pointing in a first direction and having a second camera module pointing in a second direction has been placed on a table such that one camera module (e.g., facing the table) is receiving less light compared to the other camera module (e.g., facing away from the table).

In some examples, when a threshold difference is identified between the first and second parameter values indicative of an object being adjacent a lens, the example image capture device automatically retracts one or both of the camera modules to protect the lens of the retracted camera module(s) from being damaged and/or scratched. In some examples, when the image capture device retracts one or both of the camera modules, the retracted camera module(s) continue obtaining and/or recording image and/or video data from the retracted position (e.g., continues obtaining and/or recording image and/or video data from a different field of view). In other examples, when the image capture device retracts one or both of the camera modules, the camera modules are turned off such that image and/or video data is not obtained from the retracted position. In other examples, when the image capture device retracts one or both of the camera modules, the retracted image capture device and/or camera module(s) is turned off and/or paused until a trigger occurs. In some examples, the trigger is associated with a threshold difference not being present between the first and second parameter values and/or the image capture device being turned on.

In some examples, when a threshold difference is not present between the first and second parameter values, the example image capture device does not change the position of the camera modules (e.g., the camera modules remain in the extended and/or use position) and/or the camera module(s) are returned to the extended and/or use position. In other words, when the camera module(s) is retracted, in some examples, the first and second parameter values are determined and/or monitored and the camera module(s) is returned to the extended and/or use position when the threshold difference is no longer present. While the above example mentions first and second parameter values being compared to one another to determine if a threshold is satisfied, in other examples, either or both of the first and second parameter values may be compared to a reference parameter value to determine if a threshold is satisfied.

The first and second camera modules may be implemented in a mobile device (e.g., a cell phone) and may face opposite directions such that the first camera module faces forward and the second camera module faces rearward. In some examples, the camera modules may be configured to obtain image and/or video data in either the extended position or the retracted position. Typically, the retracted position protects the respective lenses from being damaged by a potential impact and the extended position provides for a greater field of view. Example image capture device(s) disclosed herein may be implemented in any type of device such as, for example, a mobile device, a wearable device, a device having a wearable form factor, a watch, goggles, glasses, an unmanned aerial vehicle, etc. Example image capture device(s) disclosed herein may include any number of camera modules (e.g., 1, 2, 3, 4, etc.).

In some disclosed examples, an object is identified as being immediately adjacent one of the lenses when a positional value (e.g., a gyroscope value) is indicative of the device (e.g., a mobile device, a wearable device) facing the object (e.g., a table, the floor, the carpet). In some examples, if the positional value is indicative of one of the camera modules facing the ground, the example image capture device may dynamically retract one or more of the camera modules to shield the lenses from being damaged and/or scratched.

FIG. 1 illustrates an example image capture device 100 that can be used to capture image and/or video data including panoramic image and/or video data. In the illustrated example, to enable the image capture device 100 to capture images and/or video data that may be later combined and/or spliced to create 180-degree and/or 360-degree views, the image capture device 100 includes a first camera module 102 and a second camera module 108. The first camera module 102 has a first lens 104 and a first sensor 106. The second camera module 108 has a second lens 110 and a second sensor 112. In some examples, the distance between the first lens 104 and the first sensor 106 is fixed such that moving the first camera module 102 does not change the distance between the first lens 104 and the first sensor 106. Similarly, in some examples, the distance between the second lens 110 and the second sensor 112 is fixed such that moving the second camera module 108 does not change the distance between the second lens 110 and the second sensor 112. In other words, in such examples, moving either of the first camera module 102 or the second camera module 108 does not change the focal length between the first lens 104 and the first sensor 106 or the focal length between the second lens 110 and the second sensor 112. The first and/or second camera modules 102, 108 may be the same or different. For example, the first camera module 102 may have a first focal length and/or a first angle of view and the second camera module 108 may have a second focal length and/or a second angle of view. The first and second sensors 106, 112 may be imaging sensors or any other suitable sensor to enable the image capture device 100 to capture image and/or video data. The first and/or second lenses 104, 110 may be any type of lens (e.g., fish eye lens, a fixed lens, a telephoto lens, etc.)

To control the position of the first and second camera modules 102, 108, in the illustrated example, the image capture device 100 includes an example camera module position controller 114. In this example, the example camera module position controller 114 independently controls the position of the first and second camera modules 102, 108 using first and second actuators 116, 118. In other words, the camera module position controller 114 can actuate the first camera module 102 independently of actuating the second camera module 108. In the illustrated example, the first and second camera modules 102, 108 are movable to an extended position external to the housing 120 shown in dashed lines and a retracted position internal to the housing 120 shown in solid lines. The first and/or second actuators 116, 118 may be implemented as voice-coil(s), dual voice-coil(s), leaf spring(s), rotary actuator(s), linear actuator(s), a micro-linear actuator(s), a solenoid actuator(s), a Piezo electric actuator(s), a spring(s), etc.

In some examples, extending the first camera module 102 and the second camera module 108 relative to a housing 120 of the image capture device 100 enables images for constructing 180-degree views and/or 360-degree views to be obtained. However, when the lenses 104, 110 are extended, the likelihood of the lenses 104, 110 being damaged and/or scratched is increased. To shield the lenses 104, 110 from being damaged and/or scratched when the camera modules 102, 108 are extended from the housing 120, the example camera module position controller 114 monitors for an event and/or trigger to occur and dynamically retracts the camera modules 102, 108 within the housing 120 if the occurrence of such an event and/or trigger is identified. The trigger(s) and/or event(s) may include identifying an object (e.g., a table, the floor, carpet) being and/or becoming immediately adjacent and/or close to the lenses 104, 110 of one of the camera modules 102, 108 as may occur, for example, when a mobile device containing the lenses 104, 110 is dropped and/or is placed on or moved toward another object or surface.

In some examples, the camera module position controller 114 begins to monitor for an event and/or trigger when the camera module position controller 114 determines that the image capture device 100 is on and in the extended position based on camera status data 119 from a camera status sensor 117 and first camera module positional data 122 associated with the first camera module 102. Based on the camera module position controller 114 determining to monitor for an event and/or trigger, the camera module position controller 114 processes first image data 124 to determine whether or not an object is immediately adjacent and/or approaching the first lens 104. Additionally and/or alternatively, in some examples, based on the camera module position controller 114 determining to monitor for an event and/or trigger, the camera module position controller 114 processes orientational data 126 received and/or accessed from an orientation sensor (e.g., a gravitational sensor, a three-axis accelerometer, a gyroscope) 128 to determine whether or not one of the lenses 104, 110 is facing the ground (e.g., Earth).

In response to the camera module position controller 114 determining to retract the first camera module 102 (e.g., in response to an event and/or trigger being identified), the camera module position controller 114 transmits a first control signal 125 to the first actuator 116 to cause the first actuator 116 to actuate the first camera module 102 into the housing 120. In some examples, retracting the first camera module 102 positions an outward most surface of the first lens 104 sub-flush relative to an exterior surface of the housing 120. In some examples, the distance between the retracted and extended positions of the first camera module 102 is approximately 0.6 millimeters (mm).

In some examples, the camera module position controller 114 begins to monitor for an event and/or trigger when the camera module position controller 114 determines that the image capture device 100 is on and in the extended position based on the camera status data 119 and second camera module positional data 131 associated with the second camera module 108. Based on the camera module position controller 114 determining to monitor for an event and/or trigger, the camera module position controller 114 processes second image data 132 to determine whether or not an object is immediately adjacent and/or approaching the second lens 110. Additionally and/or alternatively, in some examples, based on the camera module position controller 114 determining to monitor for an event and/or trigger, the camera module position controller 114 processes the orientational data 126 to determine whether or not one of the lenses 104, 110 is facing the floor.

In response to the camera module position controller 114 determining to retract the second camera module 108 and/or in response to an event and/or trigger being identified, the camera module position controller 114 transmits a second control signal 130 to the second actuator 118 to cause the second actuator 118 to retract the second camera module 108 into the housing 120. In some examples, retracting the second camera module 108 positions an outward most surface of the second lens 110 sub-flush relative to an exterior surface of the housing 120. In some examples, the distance between the retracted and extended positions of the second camera module 108 is approximately 0.6 millimeters (mm). In some examples, the camera modules 102, 108 are always both extended or both retracted. Therefore, in some examples, the position of only one of the modules is used in the above.

Figure 2:
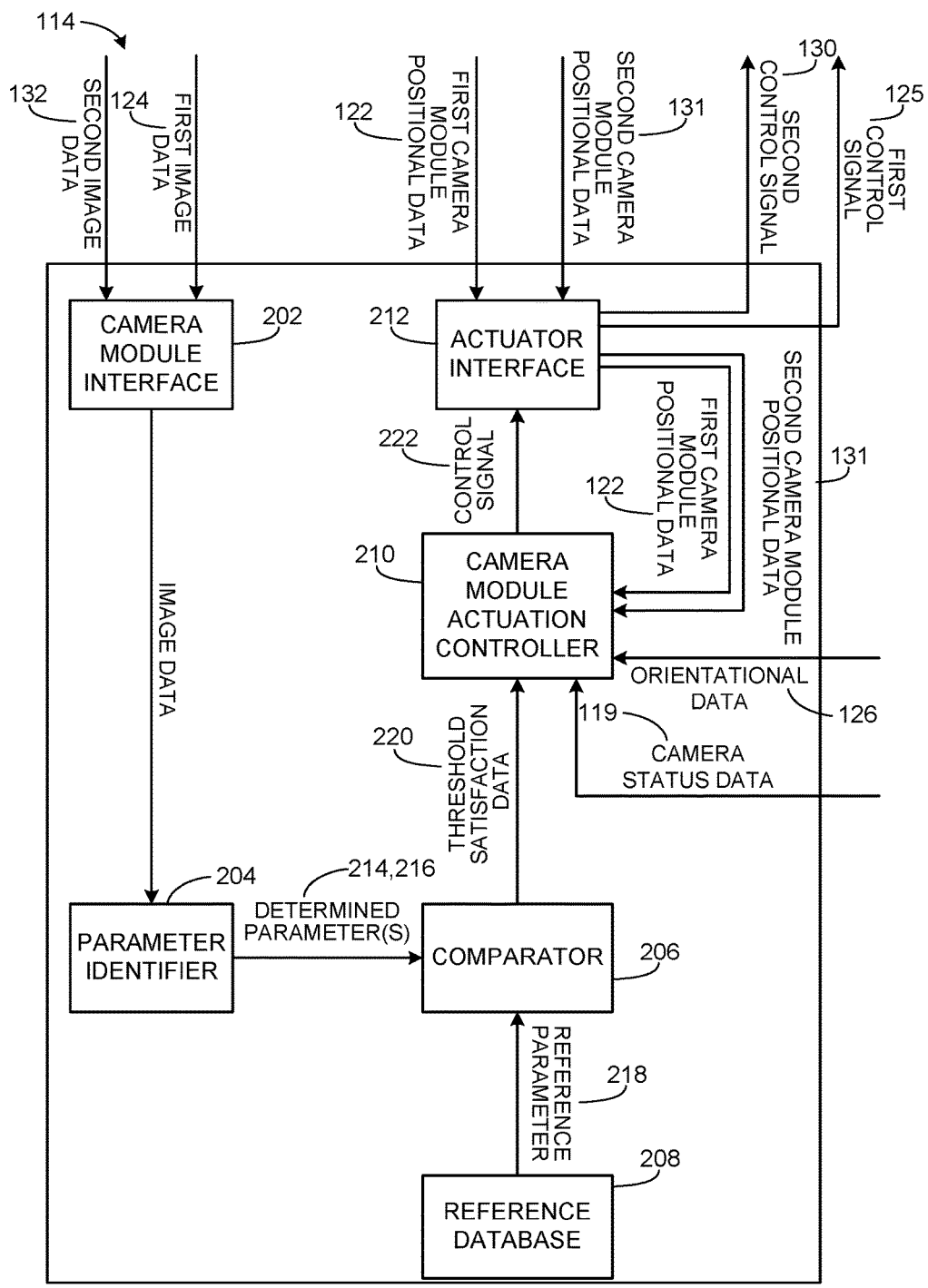
FIG. 2 is a schematic illustration of an example implementation of the camera module position controller of FIG. 1.

FIG. 2 illustrates an example implementation of the camera module position controller 114 of FIG. 1. As explained above, the controller 114 automatically controls the position (e.g., extended or retracted) of the first and/or second camera modules 102, 108 based on the status (e.g., camera on, camera off) of the image capture device 100, the orientation of the image capture device 100 and/or parameter(s) determined from image and/or video data obtained from the first and/or second camera modules 102, 108. In this example, the camera module position controller 114 includes an example camera module interface 202, an example parameter identifier 204, an example comparator 206, an example reference database 208, an example camera module actuation controller 210 and an example actuator interface 212.

In the illustrated example, the first and second image data 124, 132 respectively captured by the first camera module 102 and the second camera module 108 is received and/or accessed by the camera module interface 202. To determine a first parameter value 214 of the first image data 124, the parameter identifier 204 accesses and processes the first image data 124. Similarly, to determine a second parameter value 216 of the second image data 132, the parameter identifier 204 accesses and processes the second image data 132. The first and/or second parameter values 214, 216 may be representative of light intensity, brightness, luminosity values and/or any other parameter associated with, derivable from and/or otherwise the first and second image data 124, 132. Thus, the parameter identifier 204 may generate the parameter values by processing the pixel data contained in the image data to generate value(s) representing the derived characteristic.

To determine if an object (e.g., the floor, a table, etc.) is immediately adjacent one or more of the lenses 104, 110, in some examples, the comparator 206 compares the first parameter value 214 and the second parameter value 216 to determine if a threshold difference is present between the first and second parameter values 214, 216. When at least a threshold difference is identified between the first parameter value (e.g., a first luminosity, brightness or intensity value) 214 and the second parameter value (e.g., a second luminosity, brightness or intensity value) 216, in some examples, the comparator 206 determines that an object is present immediately adjacent at least one of the first and second lenses 104, 110. As used herein, "immediately adjacent" is defined to be within 0 to 1 inch. Based on the comparison between the first and second parameter values 214, 216, the comparator 206 generates threshold satisfaction data 220 to be transmitted to and/or accessible by the camera module actuation controller 210. Depending on the outcome of the comparison, the threshold satisfaction data 220 may indicate that the threshold difference between the first and second parameter values 214, 216 exists (i.e., was satisfied) or does not exist (i.e., was not satisfied). In other words, the threshold satisfaction data 220 may or may not indicate that an object is adjacent one of the lenses 104, 110 depending on the environment of the lenses 104, 110. The comparator 206 may be implemented, for example, by a processor or operational amplifier (op-amp).

In other examples, to determine if an object is immediately adjacent the first lens 104, the comparator 206 compares the first parameter value 214 to a reference parameter value 218 received and/or accessed from the reference database 208 to determine if a threshold difference is present between the first parameter value 214 the reference parameter value 218. Similarly, to determine if an object is immediately adjacent the second lens 110, the comparator 206 compares the second parameter value 216 to the reference parameter value 218 to determine if a threshold difference is present between the second parameter value 216 and the reference parameter value 218. When the threshold difference is identified between either of the first and second parameter values 214, 216 and the reference parameter value 218, in some examples, the comparator 206 determines that an object is present immediately adjacent the respective lenses 104, 110. Based on the comparison between either of the first and second parameter values 214, 216 and the reference parameter value 218, the comparator 206 of the example generates the threshold satisfaction data 220 that is accessible by the camera module actuation controller 210.

To determine whether or not to actuate (e.g., retract, extend) the first and/or second camera module 102, 108, in some examples, the camera module actuation controller 210 accesses and processes the threshold satisfaction data 220, the first camera module positional data 122, the second camera module positional data 131, the orientational data 126 and/or the camera status data 119. In some examples, based on the camera module actuation controller 210 determining to monitor for an event and/or trigger and the threshold satisfaction data 220 indicating that a threshold difference is present between the light sensed by the camera modules 102, 108 (e.g., between the first and second parameter values 214, 216 or between either of the first and second parameter values 214, 216 and the reference parameter value 218), the camera module actuation controller 210 generates a control signal 222 that is transmitted to and/or accessed by the actuator interface 212. In some examples, the control signal 222 is conveyed to the first actuator 116 as the first control signal 125 and/or conveyed to the second actuator 118 as the second control signal 130. In some examples, the actuator interface 212 is omitted. When included, the actuator interface 212 may be implemented by, for example, a splitter, a repeater, etc.

Additionally and/or alternatively, to determine whether or not to actuate the first and/or second camera modules 102, 108, in some examples, the camera actuation controller 210 receives and/or accesses the orientational data 126, the camera status data 119, the first camera module positional data 122 and/or the second camera module positional data 131. In some examples, based on the camera module actuation controller 210 determining to monitor for an event and/or trigger and the orientational data 126 indicating that the first lens 104 and/or the second lens 110 is facing the ground, the camera module actuation controller 210 generates the control signal 222 that is transmitted to and/or accessed by the actuator interface 212 and the first actuator 116 and/or the second actuator 118. While the above examples mention the camera module actuation controller 210 using either of the threshold satisfaction data 220 or the orientational data 126 when determining whether or not an object is adjacent one of the lenses 104, 110, in other examples, the camera module actuation controller 210 uses both the threshold satisfaction data 220 and the orientational data 126 when determining the presence of an object approaching and/or adjacent one or more of the lenses 104, 110. The camera module controller 210 may be implemented by, for example, a semiconductor device such as, a controller, a processor, a microprocessor, etc.

The reference database 208 may be implemented by any type of storage device (e.g., a volatile memory, non-volatile memory, DRAM, etc.

While an example manner of implementing the camera module position controller 114 of FIG. 1 is illustrated in FIG. 2, one or more of the elements, processes and/or devices illustrated in FIG. 2 may be combined, divided, re-arranged, omitted, eliminated and/or implemented in any other way. Further, the example camera module interface 202, the example parameter identifier 204, the example comparator 206, the example reference database 208, the example camera module actuation controller 210 and the example actuator interface 212 and/or, more generally, the example camera module position controller 114 of FIG. 2 may be implemented by hardware, software, firmware and/or any combination of hardware, software and/or firmware. Thus, for example, any of the example camera module interface 202, the example parameter identifier 204, the example comparator 206, the example reference database 208, the example camera module actuation controller 210 and the example actuator interface 212 and/or, more generally, the example camera module position controller 114 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example camera module interface 202, the example parameter identifier 204, the example comparator 206, the example reference database 208, the example camera module actuation controller 210 and the example actuator interface 212 and/or, more generally, the example camera module position controller 114 of FIG. 2 is/are hereby expressly defined to include a non-transitory computer readable storage device or storage disk such as a memory, a digital versatile disk (DVD), a compact disk (CD), a Blu-ray disk, etc. storing the software and/or firmware. Further still, the example camera module position controller 114 of FIG. 1 may include one or more elements, processes and/or devices in addition to, or instead of, those illustrated in FIG. 2, and/or may include more than one of any or all of the illustrated elements, processes and devices.

Figure 3:
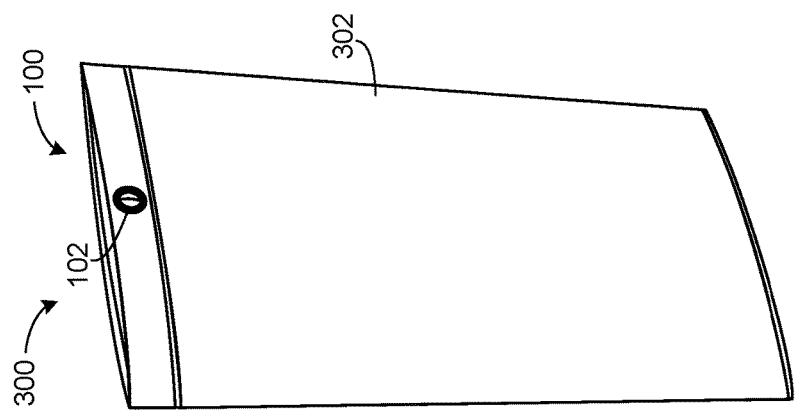
FIG. 3 is an isometric view of an example implementation of the mobile device including the example image capture device of FIG. 1.

FIG. 3 is an isometric view of an example mobile device 300 including a body 302 and the image capture device 100 of FIG. 1. In the illustrated example of FIG. 3, the first camera module 102 of the image capture device 100 is depicted in the extended position.

Figure 4:
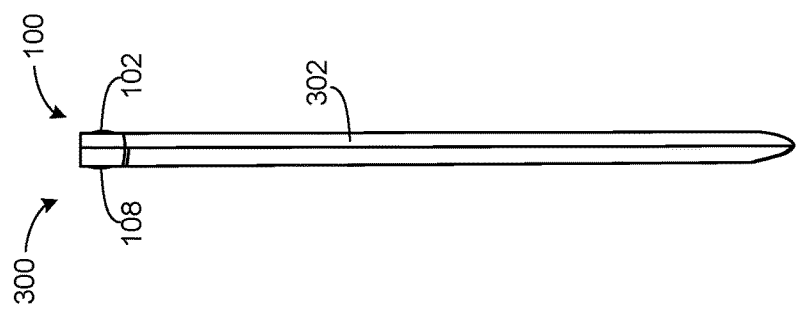
FIG. 4 is a side view of the example mobile device of FIG. 3.

FIG. 4 is a side view of the example mobile device 300 of FIG. 3 showing the first and second camera modules 102, 108 of the image capture device 100 in the extended position. In the illustrated example, the first and second camera modules 102, 108 oppose one another. In some examples, the first and second camera modules 102, 108 are coaxially disposed. In other examples, longitudinal axes of the first and second camera modules 102, 108 are offset and/or spaced relative to one another. In some examples, the longitudinal axes of the first and second camera modules 102, 108 are parallel relative to one another. In other examples, the longitudinal axes of the first and second camera modules 102, 108 are non-parallel relative to one another.

Figure 5:
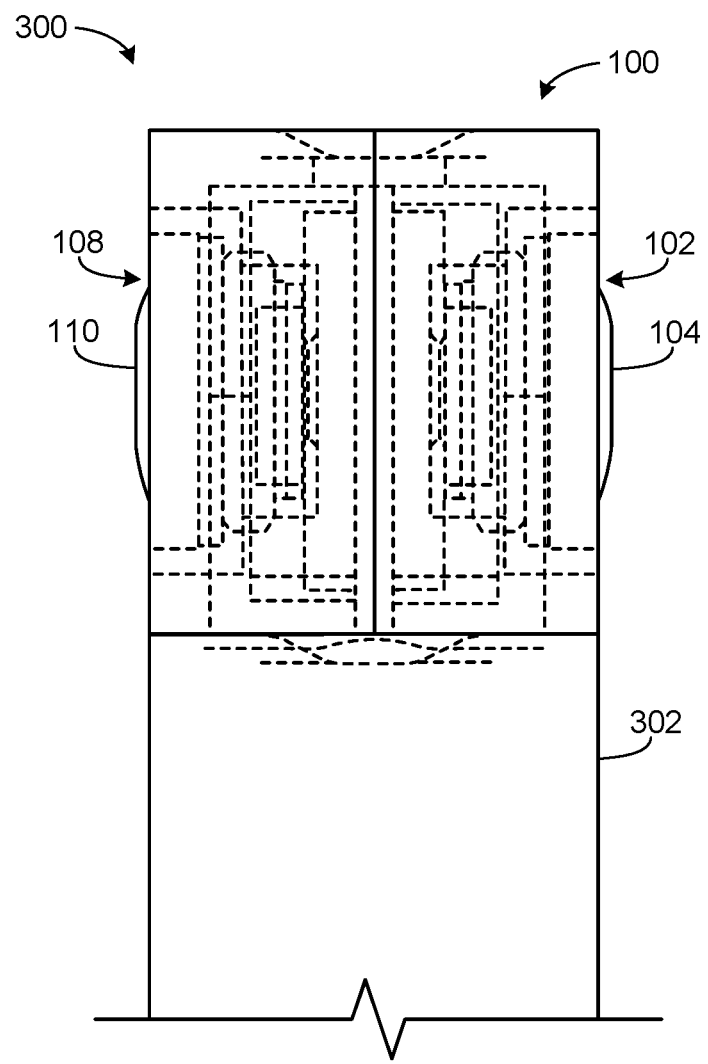
FIG. 5 is an expanded side view of the example mobile device of FIG. 3 in which example camera modules are disposed in an extended position.

FIG. 5 is an expanded (e.g., enlarged) side view of the example mobile device 300 of FIG. 3 showing the first and second lenses 104, 110 of the first and second camera modules 102, 108 in the extended position. In FIG. 5, parts of the camera modules 102, 108 are shown in phantom lines.

Figure 6:
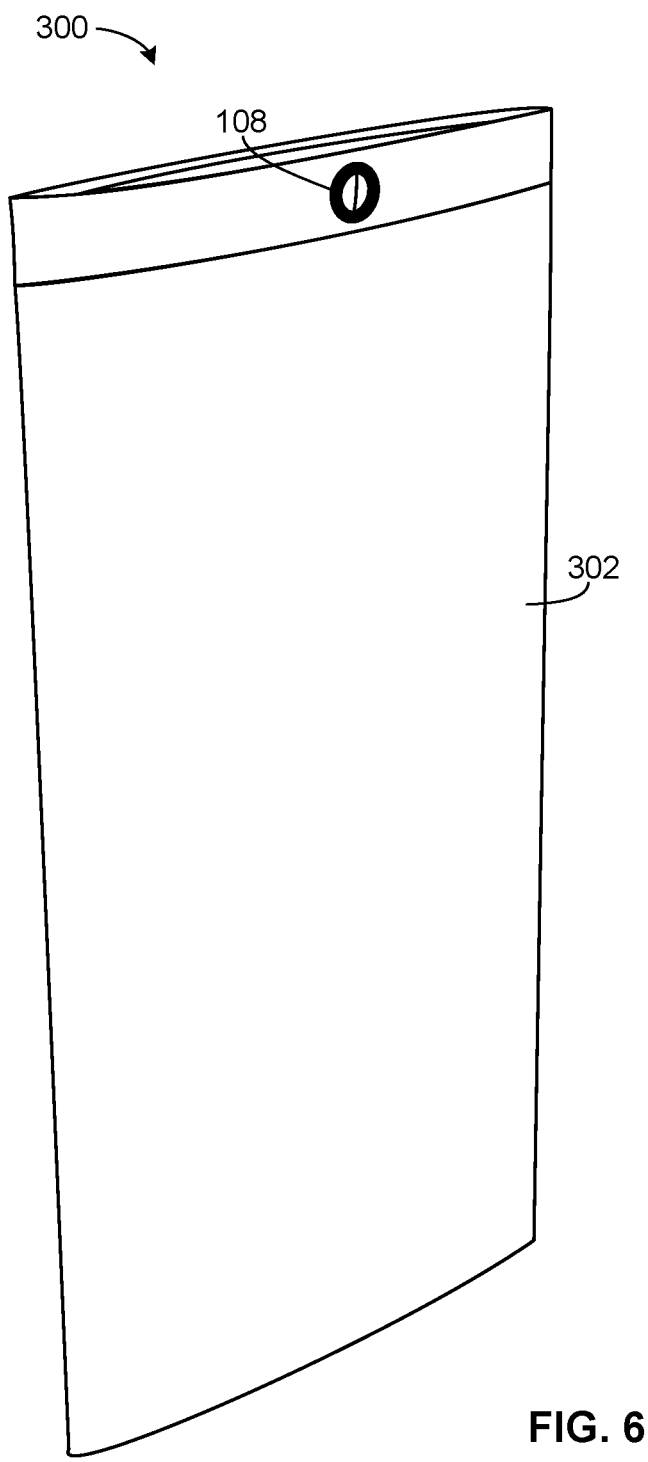
FIG. 6 is another isometric view of the example mobile device of FIG. 3, but shows the opposite side of the device of FIG. 3.

FIG. 6 is an isometric view of the example mobile device 300 of FIG. 3 showing the second camera module 108 in the extended position. FIG. 6 is a rear view opposite to that shown in FIG. 3.

Figure 7:
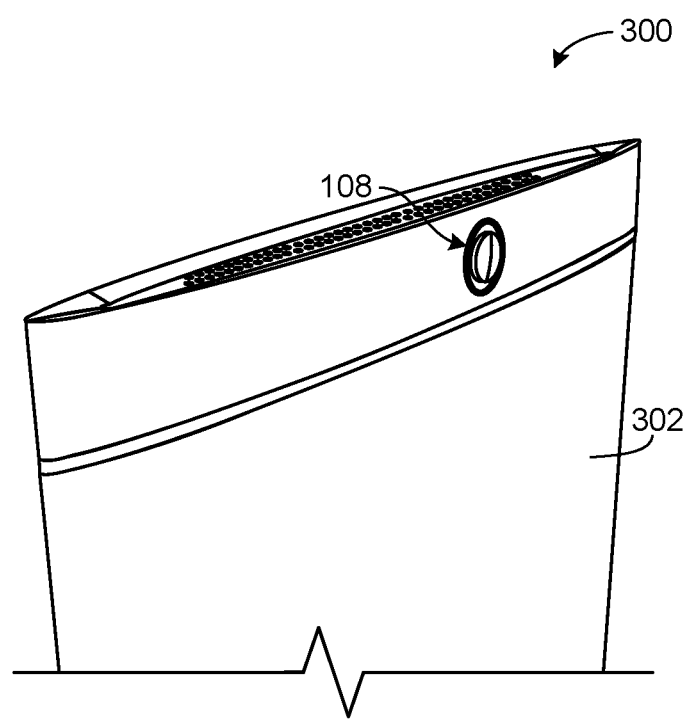
FIG. 7 is an expanded isometric view of the example mobile device of FIG. 3 in which the example camera modules are disposed in the extended position.
Figure 8:
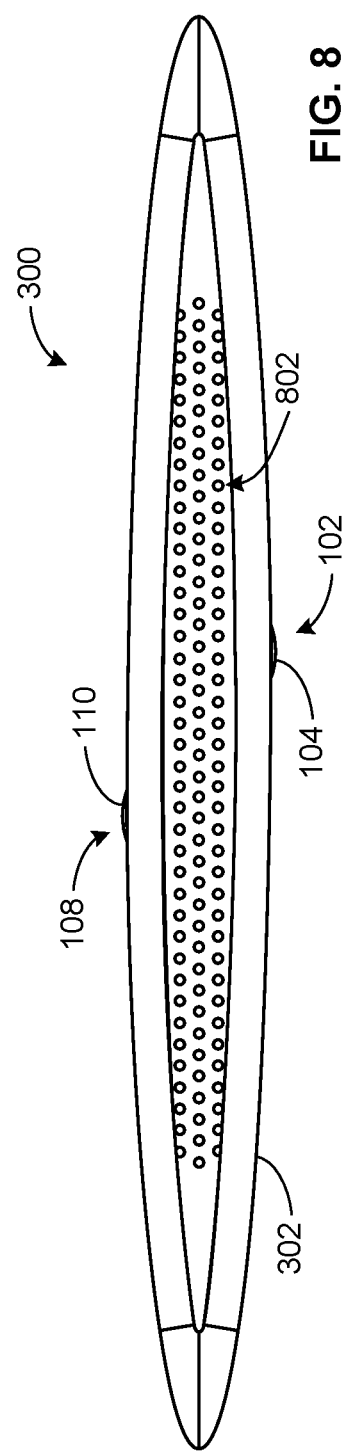
FIG. 8 is a top view of the example mobile device of FIG. 3 in which the example camera modules are disposed in the extended position.

FIG. 7 is a detailed isometric view of the example mobile device 300 of FIG. 3 showing the second camera module 108 in the extended position FIG. 8 is a top view of the example mobile device 300 of FIG. 3 showing a microphone(s) and/or audio sensor(s) 802.

FIG. 8 shows the first and second lenses 104, 110 of the first and second camera modules 102, 108 in the extended position.

Figure 9:
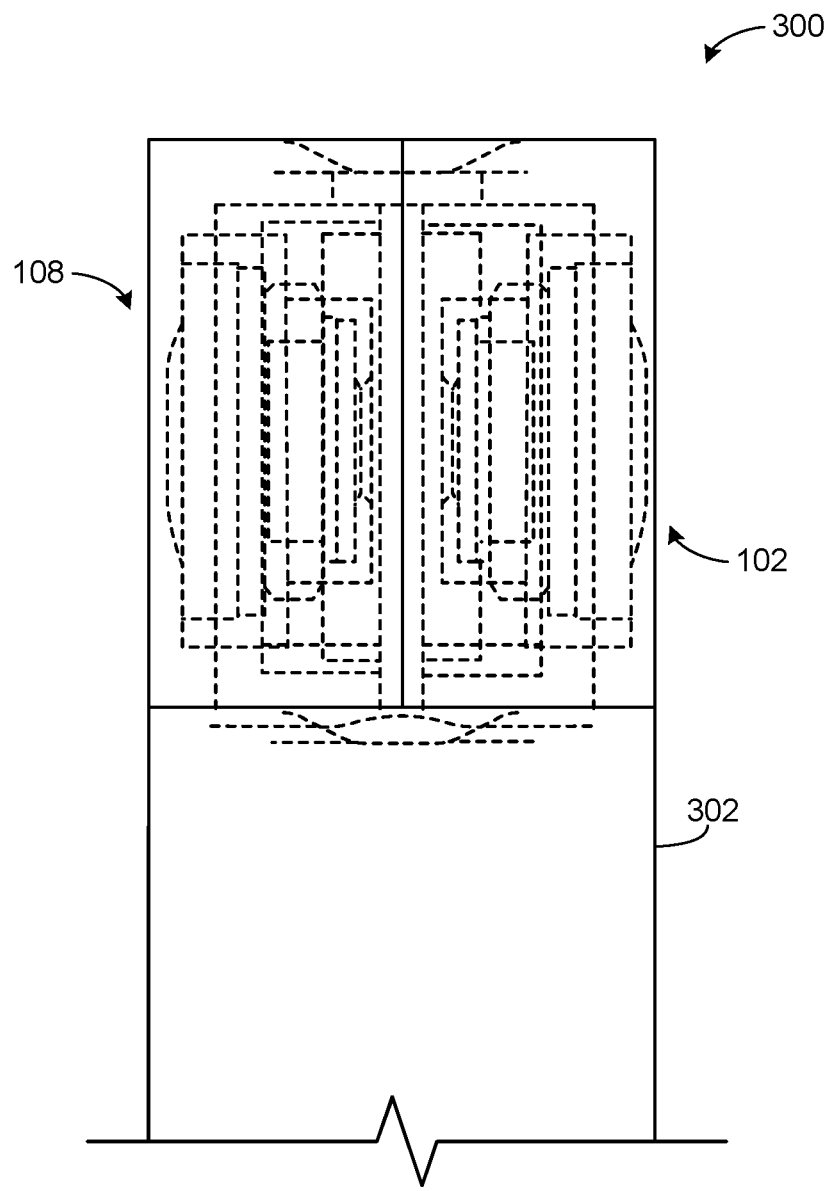
FIG. 9 is an expanded side view of the example mobile device of FIG. 3 illustrating in phantom lines the example camera modules disposed in retracted positions.

FIG. 9 is an expanded side view of the example mobile device 300 of FIG. 3 similar to FIG. 5 but showing the first and second camera module 102, 108 in the retracted position.

Figure 10:
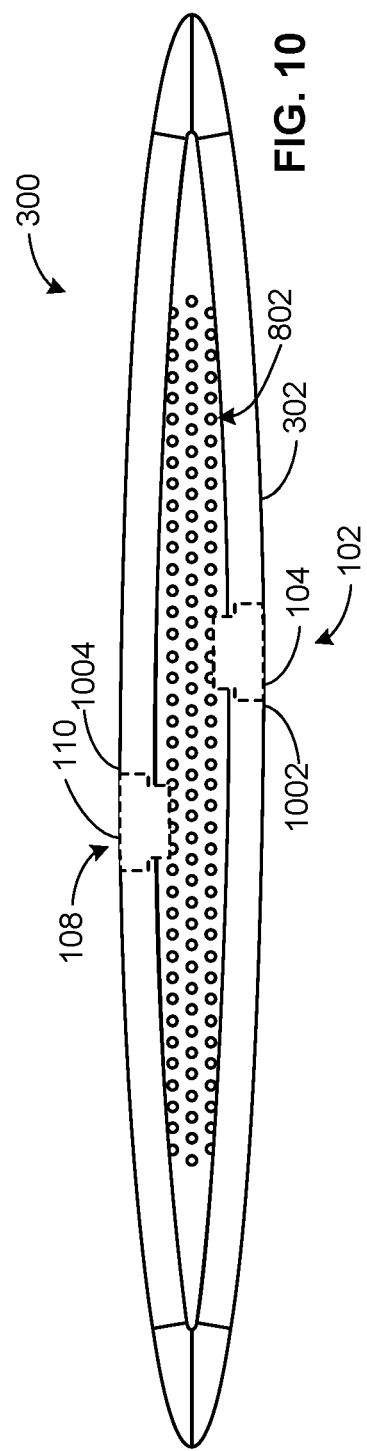
FIG. 10 is a top view of the example mobile device of FIG. 3 in which the example camera modules are disposed in the retracted position.

FIG. 10 is a top view of the example mobile device 300 including the first and second camera modules 102, 108 in the retracted position. In the illustrated example, the lenses 104, 110 are depicted as being sub-flush relative to adjacent exterior surfaces 1002, 1004 of the body 302 (e.g., lower than the surrounding structures of the housing).

Figure 11:
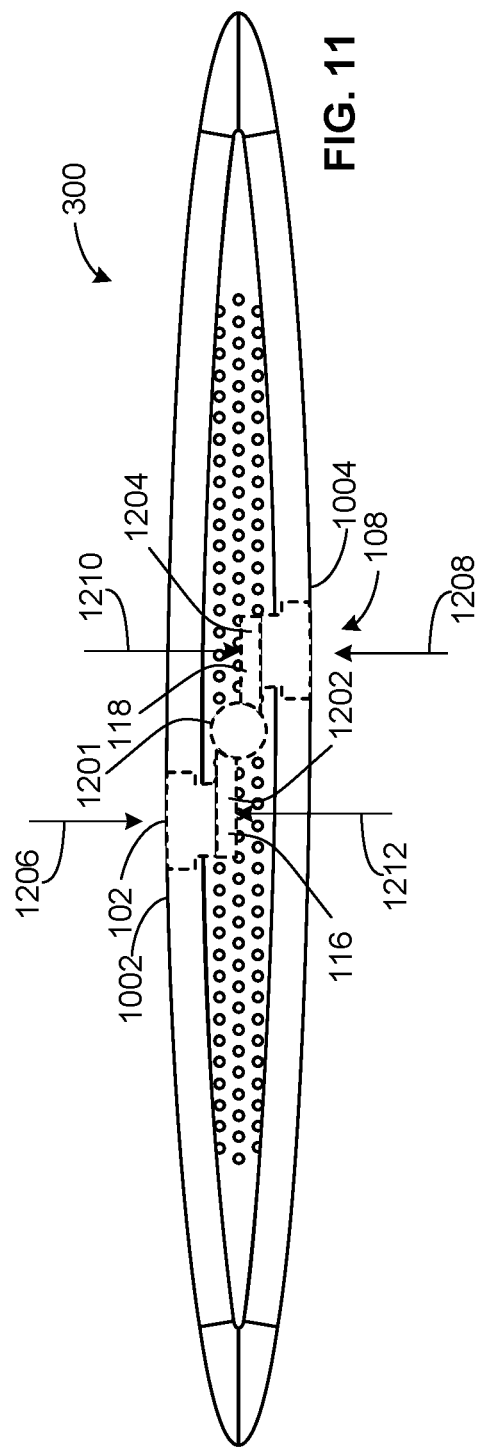
FIG. 11 is a top view of the example mobile device of FIG. 3 showing an example actuator coupled to example first and second camera modules.

FIG. 11 is a top view of the example mobile device 300 similar to FIG. 10 but showing the first actuator 116 and the second actuator 118. In this example, the first and second actuators 116, 118 are implemented as a voice coil 1201 including a first arm 1202 coupled to the first camera module 102 and a second arm 1204 coupled to the second camera module 108. A voice coil is a type of spring traditionally used in the cone of a loud speaker. Here it is engaged to simultaneously move two separate camera modules in opposite directions. In operation, to retract the first and second camera modules 102, 108 relative to the immediately adjacent exterior surfaces 1002, 1004, the voice coil 1201 of FIG. 11 rotates the first and second arms 1202, 1204 counterclockwise and in a direction generally represented by arrows 1206, 1208. To extend the first and second camera modules 102, 108 relative to the immediately adjacent exterior surfaces 1002, 1004, in the illustrated example, the voice coil 1201 rotates the first and second arms 1202, 1204 clockwise and in a direction generally represented by arrows 1210, 1212. In some examples, the first and second arms 1202, 1204 have sufficient rigidity to move the first and second camera modules 102, 108 at approximately the same rate and/or at approximately the same time based on an input and/or rotation of the voice coil 1201.

Figure 12:
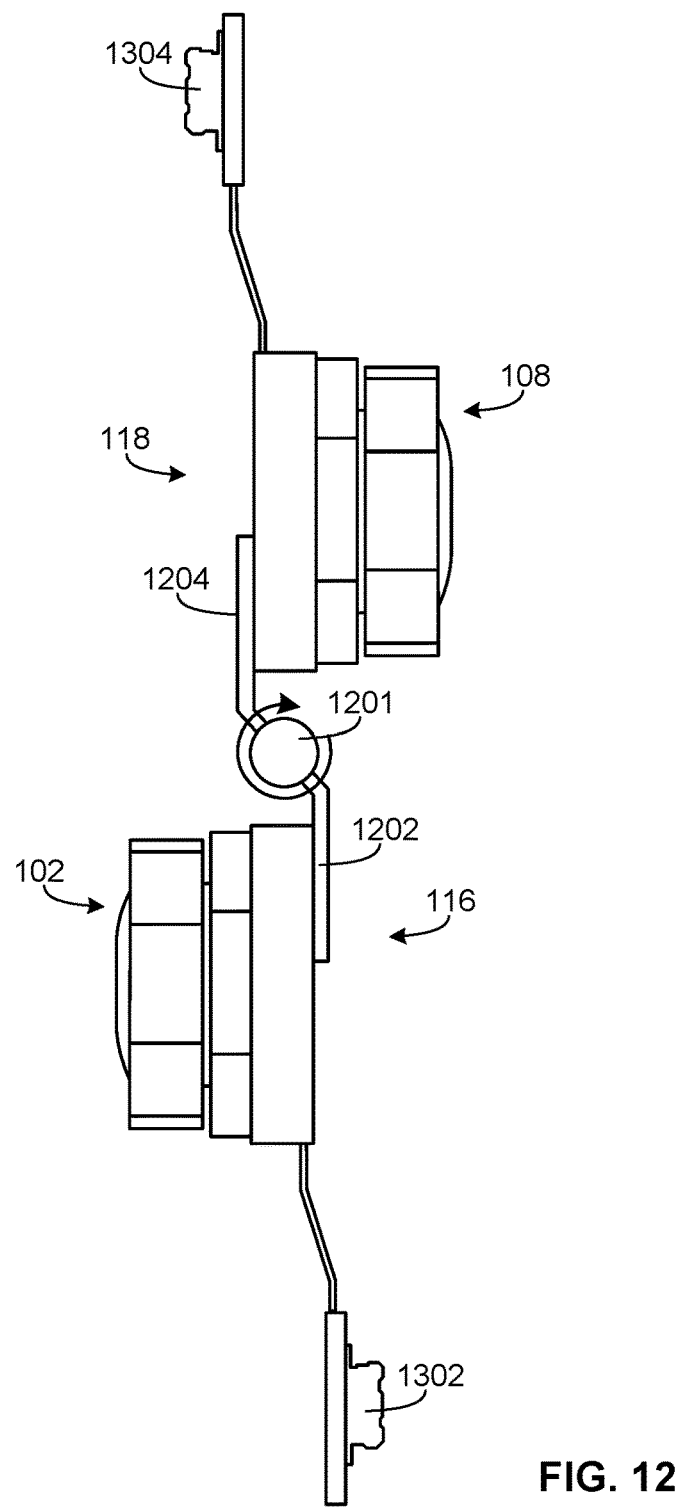
FIG. 12 is a top view of the example image capture device of FIG. 11.

FIG. 12 is a top view of the first and second camera modules 102, 108 and the first and second actuators 116, 118. In this example, the first and second actuators 116, 118 are implemented as the first arm 1202 and the second arm 1204 coupled to the voice coil 1201. Energizing the voice coil 1201 causes rotation which drives the arms 1202, 1204 in opposite directions. In the illustrated example, to enable the first image data 124 and/or power to be received at and/or conveyed from the first camera module 102, the first camera module 102 includes a first interface 1302. Similarly, in the illustrated example, to enable the second image data 132 and/or power to be received at and/or conveyed from the second camera module 108, the second camera module 108 includes a second interface 1304. The interfaces 1302, 1304 may be coupled to connectors from a power supply and/or to connectors to the first and second camera modules 102, 108.

Figure 13:
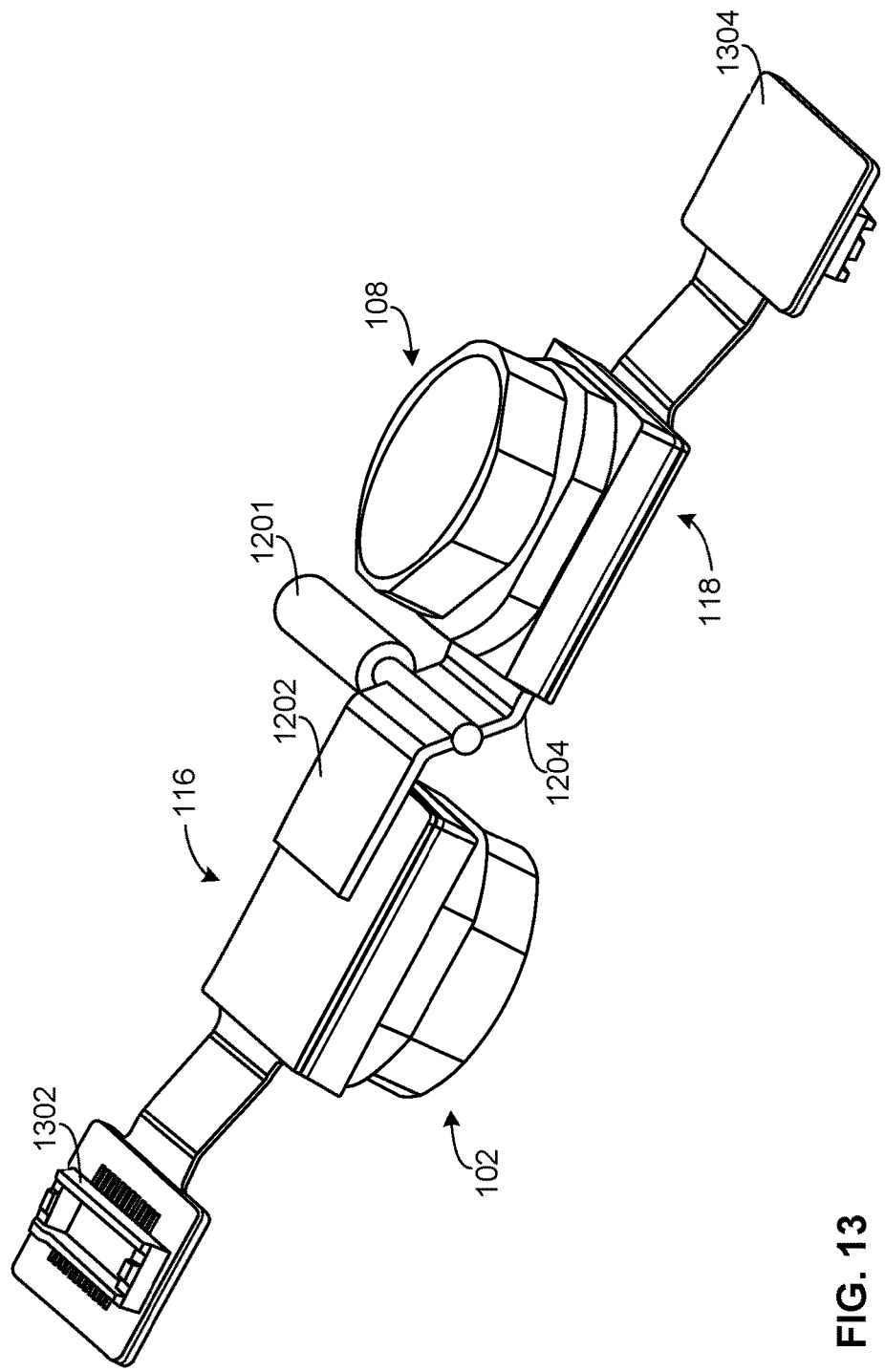
FIG. 13 is an isometric view of the example image capture device of FIG. 11.

FIG. 13 is an isometric view of the first and second camera modules 102, 108 and the first and second actuators 116, 118. As shown in FIG. 13, the interfaces 1302, 1304 may be implemented by connectors.

FIG. 14 is a side view of the first and second camera modules 102, 108, the interfaces 1302, 1304 and the first and second actuators 116, 118 of FIGS. 13 and 14.

FIG. 15 is an isometric view of an example mobile device 1600 implemented with an example image capture device 1602 that is similar to the image capture device 100 of FIG. 1. However, in contrast to the image capture device 100 of FIG. 1, the example image capture device 1602 of FIG. 15 includes three camera modules. In particular, the image capture device 1602 includes the first camera module 102 on a first side 1604 of the mobile device 1600, and the second camera module 108 and a third camera module 1606 on a second side 1608 of the mobile device 1600. In some examples, the example image capture device 1602 includes an actuator for each of the first camera module 102, the second camera module 108 and the third camera module 1606. However, the camera modules 102, 108 and/or 1606 may be actuated in any suitable way. As in the example of FIG. 3, the camera modules 102, 108, 1606 of the example of FIG. 15 are automatically retracted in response to certain events or triggers such as explained above in connection with FIG. 3.

FIG. 16 is a side view of the example mobile device 1600 showing the first camera module 102 and the third camera module 1606 in the extended position.

FIG. 17 is another isometric view of the example mobile device 1600 showing the second camera module 108 and the third camera module 1606 in the extended position.

Figure 18:
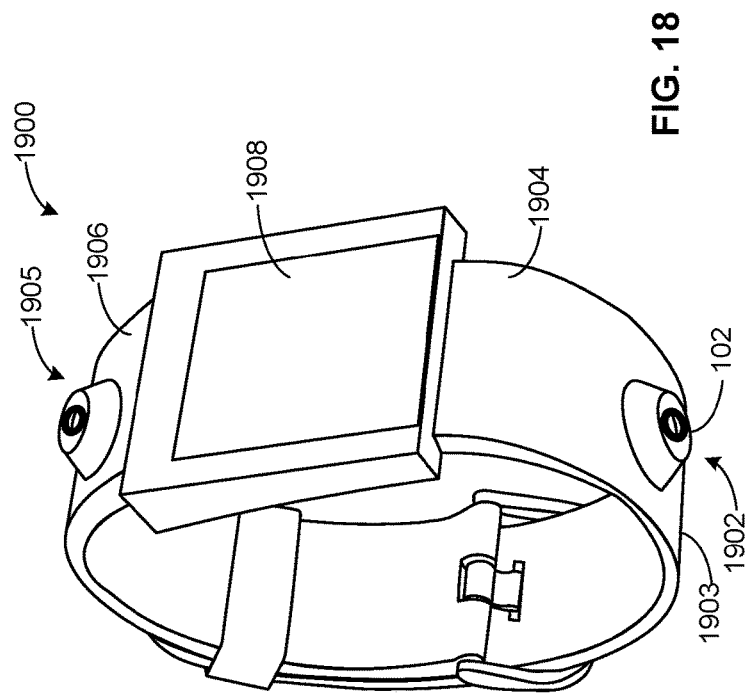
FIG. 18 is an isometric view of an example wearable mobile device to be worn on a wrist or arm and with an example image capture device implemented in accordance with the teachings of this disclosure.

FIG. 18 is an example wearable device 1900 implemented as a watch. The example wearable device 1900 of FIG. 18 is implemented with an example image capture device 1902 that is similar to image capture device 100 of FIG. 1. However, in contrast to the image capture device 100 of FIG. 1, the image capture device 1902 of FIG. 18 includes the first camera module 102 but does not include an opposing camera module (e.g., the second camera module 108 of FIG. 1). Otherwise, the image capture device 1902 operates in the same manner as the image capture device 100 of FIG. 1. In the illustrated example, the first camera module 102 is coupled to a first portion 1903 of a strap 1904. In some examples, another image capture device 1905 is coupled to a second portion 1906 of the strap 1904 such that the image capture devices 102, 1905 are disposed on either side of a face 1908 of the wearable device 1900. In other examples, only one camera module is employed.

Figure 19:
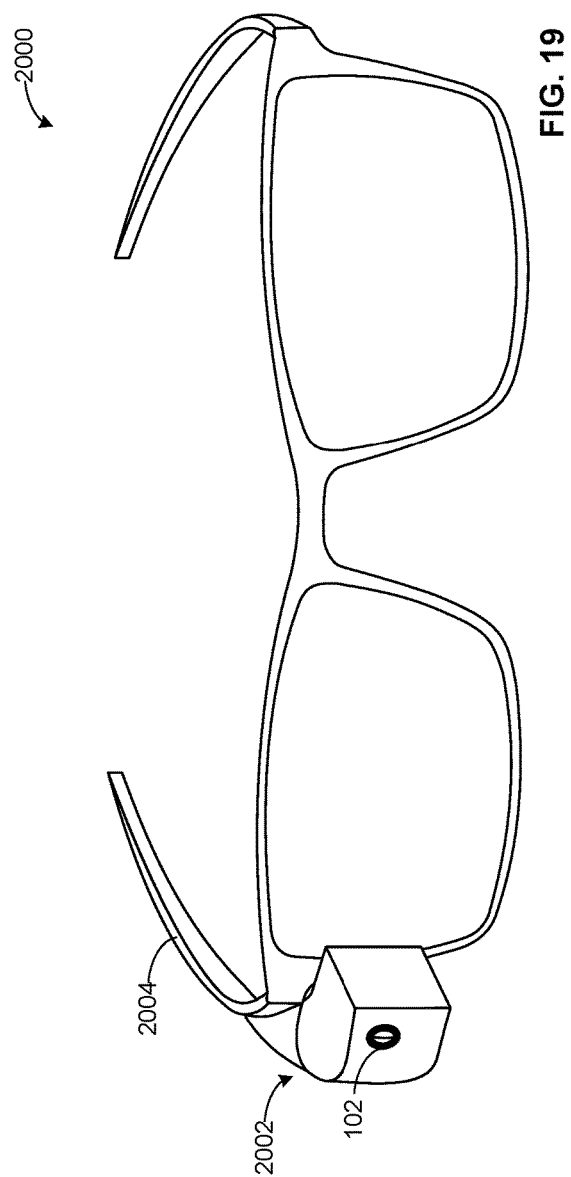
FIG. 19 is an isometric view of example glasses with an example image capture device implemented in accordance with the teachings of this disclosure.

FIG. 19 illustrates example glasses 2000 implemented with an example image capture device 2002 that is similar to the image capture device 100 of FIG. 1. However, in contrast to the image capture device 100 of FIG. 1, the image capture device 2002 includes only one camera module. In particular, the example device includes the first camera module 102 but does not include the opposing camera module (e.g., the second camera module 108). In the illustrated example, the first camera module 102 is coupled (e.g., removably coupled, fixably coupled, etc.) to a temple and/or arm 2004 of the wearable device 2000. Otherwise, the example image capture device 2002 of FIG. 19 operates in the same manner as the example image capture device 100.

Figure 20:
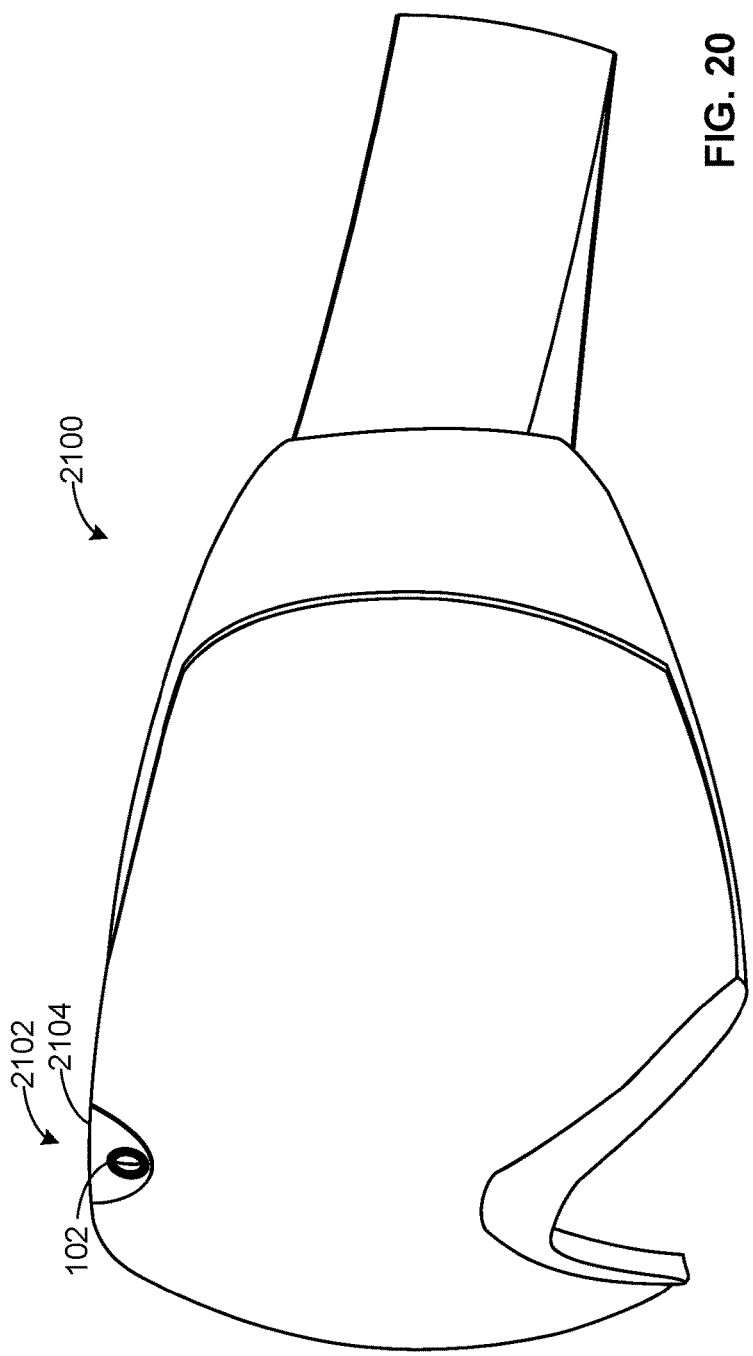
FIG. 20 is an isometric view of example goggles with an example image capture device implemented in accordance with the teachings of this disclosure.

FIG. 20 illustrates example goggles 2100 implemented with an example image capture device 2102 that is similar to image capture device 100 of FIG. 1. However, in contrast to the image capture device 100 of FIG. 1, the image capture device 2102 of the example of FIG. 20 includes the first camera module 102 but does not include an opposing camera module (e.g., the second camera module 108). Otherwise, the example image capture device 2102 of FIG. 20 operates in the same manner as the example image capture device 100 of FIG. 1. In the illustrated example, the first camera module 102 is coupled to a bridge 2104 of the wearable device 2100.

Figure 22:
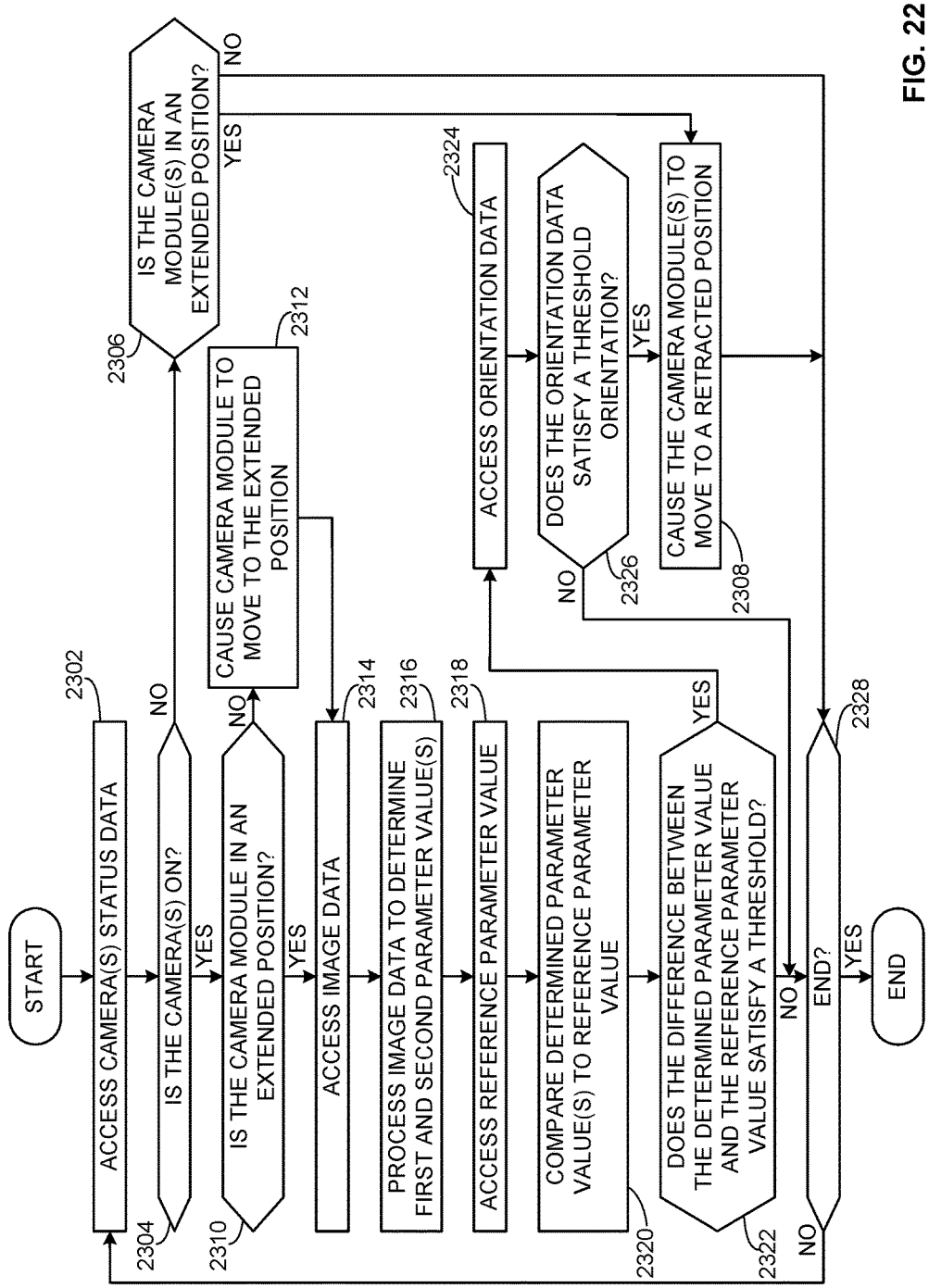
FIG. 22 is a flow chart representative of machine readable instructions that may be executed to implement the example camera module position controller of FIGS. 1 and/or 2.
Figure 23:
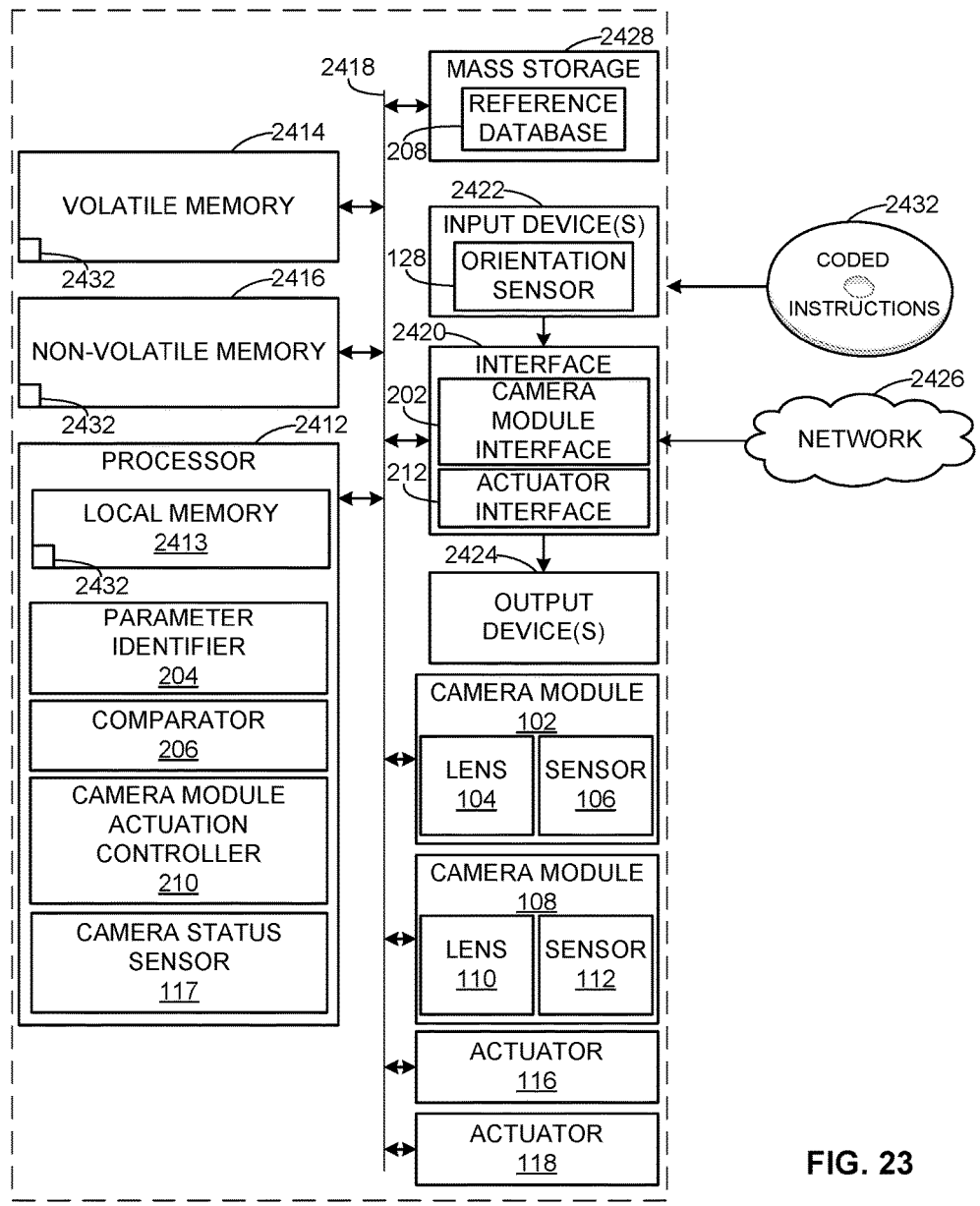
FIG. 23 illustrates a processor platform which may execute the instructions of FIGS. 22 and/or 23 to implement the camera module position controller of FIGS. 1 and/or 2.

Flowcharts representative of example machine readable instructions for implementing the camera module position controller 114 of FIG. 2 is shown in FIGS. 22 and 23. In these examples, the machine readable instructions are a program for execution by a processor such as the processor 2412 shown in the example processor platform 2400 discussed below in connection with FIG. 23. The program may be embodied in software stored on a tangible computer readable storage medium such as a CD-ROM, a floppy disk, a hard drive, a digital versatile disk (DVD), a Blu-ray disk, or a memory associated with the processor 2412, but the entire program and/or parts thereof could alternatively be executed by a device other than the processor 2412 and/or embodied in firmware or dedicated hardware. Further, although the example program is described with reference to the flowcharts illustrated in FIGS. 22 and 23, many other methods of implementing the example camera module position controller 114 may alternatively be used. For example, the order of execution of the blocks may be changed, and/or some of the blocks described may be changed, eliminated, or combined.

As mentioned above, the example processes of FIGS. 22 and 23 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 22 and 23 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 21:
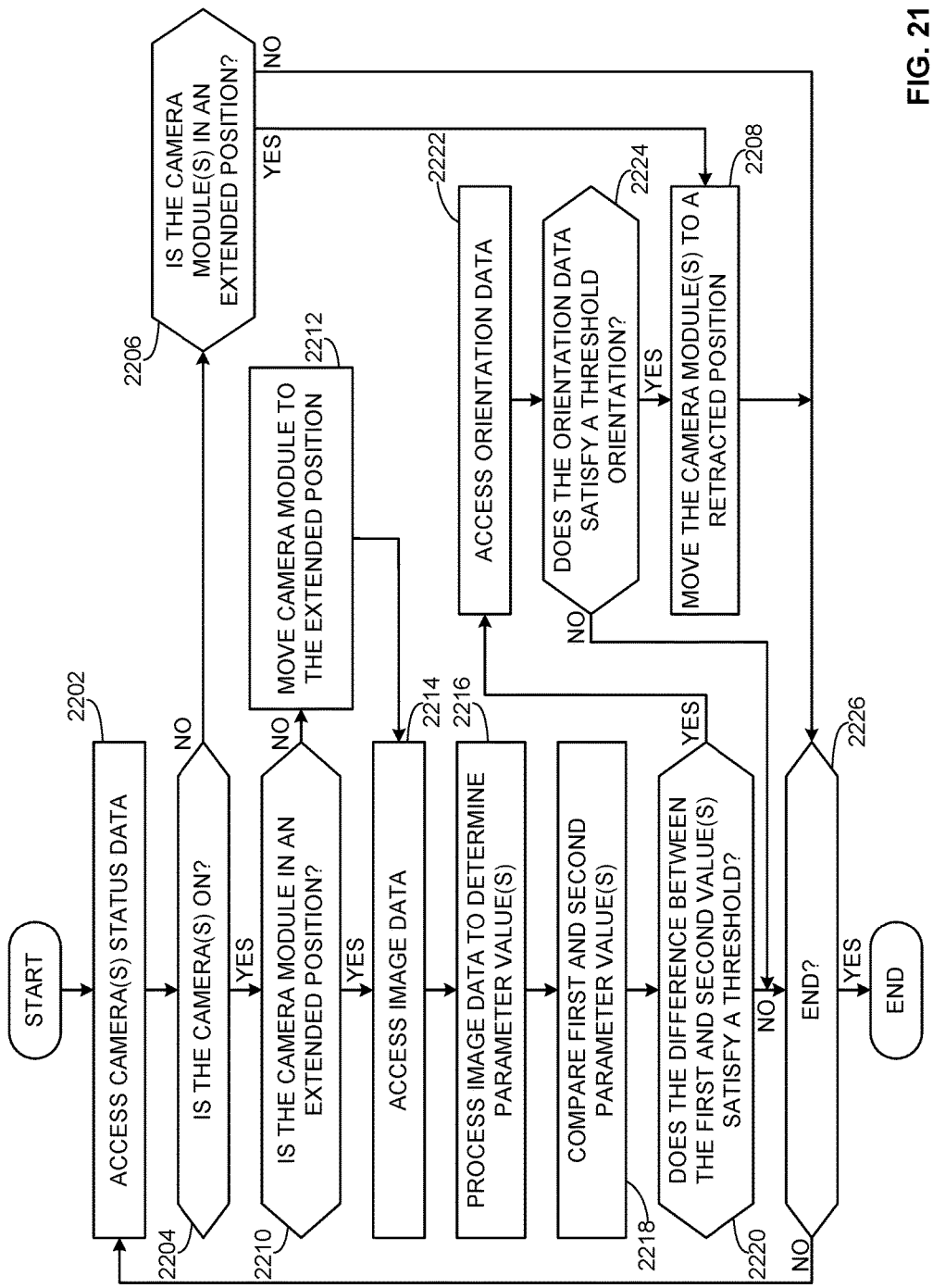
FIG. 21 is a flow chart representative of machine readable instructions that may be executed to implement the example camera module position controller of FIGS. 1 and/or 2.

The program of FIG. 21 begins when the camera status data is accessed (block 2202) by, for example, the camera module actuation controller 210 receiving and/or accessing the camera status data 119 from the camera status sensor 117. The camera module actuation controller 210 processes the camera status data 119 to determine whether or not the image capture device 100 is on (block 2204). If the camera is not on (block 2204), the camera module actuation controller 210 processes either of the first camera module positional data 122 and/or the second camera module positional data 131 to determine the position of the first camera module 102 and/or to determine the position of the second camera module 108 (block 2206).

If the camera module(s) is in the extended position (block 2206), the camera module actuation controller 210 generates and/or transmits the first control signal 125 to the first actuator 116 to cause the first camera module 102 to be retracted and/or generates and/or transmits the second control signal 130 to the second actuator 118 to cause the second camera module 108 to be retracted (block 2208). In some examples, the first and second camera modules 102, 108 are retracted at substantially the same time. As used herein, the phrase "retracting at substantially the same time" accounts for slight movement delays based on physical, electrical and/or environmental factors such as material flexibility at the coupling between the first camera module 102 and the first actuator 116 and material flexibility at the coupling between the second camera module 108 and the second actuator 118. However, in other examples, the first and second camera modules 102, 108 are independently actuatable and/or may move at different rates relative to one another.

If, however the camera is on (block 2204), the camera module actuation controller 210 processes the first camera module positional data 122 and/or the second camera module positional data 131 to determine whether the first camera module 102 and/or the second camera module 108 are in the extended position (block 2210). If the camera module(s) are not in the extended position (block 2210), the camera module(s) moves to the extended position by, for example, the camera module actuation controller 210 initiating the first control signal 125 to the first actuator 116 to cause the first camera module 102 to be extended and/or the camera module position controller 114 initiating the second control signal 130 to the second actuator 118 to cause the second camera module 108 to be extended (block 2212). In some examples, the first and second camera modules 102, 108 are extended at substantially the same time.

After control passes from blocks 2210 and/or 2212, the parameter identifier 204 obtains the first image data 124 from the first camera module 102 and/or the second image data 132 from the second camera module 108 via, for example, the camera module interface 202 (block 2214). The parameter identifier 204 processes the image data to determine a first parameter value and a second parameter value (block 2216). The parameter values may be, for example, a first luminosity, brightness or intensity value and/or a second luminosity, brightness or intensity value and/or a second parameter value.

The comparator 206 then compares the first and second parameter values (block 2218) to determine a difference between the first and second parameter values. The comparator 206 determines whether or not the difference between the first and second parameter values satisfies a threshold to determine if an object(s) is adjacent one of the lenses 104, 110 (block 2220). If the threshold is satisfied (block 2220), orientation data is accessed (block 2222), the camera module actuation controller 210 obtains the orientational data 126 from the orientation sensor 128 (block 2222). The camera module actuation controller 210 determines whether or not the orientation data indicates that the first lens 104 and/or the second lens 110 is facing the ground (block 2224). If one of the lenses is facing the ground (block 2224), the corresponding camera module(s) is moved to the retracted position (block 2208) by, for example, the camera module actuation controller 210 initiating the first control signal 125 to the first actuator 116 to cause the first camera module 102 to be retracted and/or the camera module position controller 114 and/or initiating the second control signal 130 to the second actuator 118 to cause the second camera module 108 to be retracted. At block 2226, control returns to block 2202 or ends.

The program of FIG. 22 begins when the camera status data is accessed (block 2302) by, for example, the camera module actuation controller 210 receiving and/or accessing the camera status data 119 from the camera status sensor 117. The camera module actuation controller 210 processes the camera status data 119 to determine whether or not the image capture device 100 is on (block 2304). If the camera is not on (block 2304), the camera module actuation controller 210 processes either of the first camera module positional data 122 and/or the second camera module positional data 131 to determine the position of the first camera module 102 and/or to determine the position of the second camera module 108 (block 2306).

If the camera module(s) is in the extended position (block 2306), the camera module actuation controller 210 generates and/or transmits the first control signal 125 to the first actuator 116 to cause the first camera module 102 to be retracted and/or generates and/or transmits the second control signal 130 to the second actuator 118 to cause the second camera module 108 to be retracted (block 2308).

If, however the camera is on (block 2304), the camera module actuation controller 210 processes either of the first camera module positional data 122 and/or the second camera module positional data 131 to determine whether the first camera module 102 and/or the second camera module 108 are in the extended position (block 2310). If the camera module(s) are not in the extended position (block 2210), the camera module(s) is moved to the extended position by, for example, the camera module actuation controller 210 initiating the first control signal 125 to the first actuator 116 to cause the first camera module 102 to be extended and/or the second control signal 130 to the second actuator 118 to cause the second camera module 108 to be extended (block 2312). In some examples, the first and second camera modules 102, 108 are extended at substantially the same time.

The parameter identifier 204 obtains the first image data 124 from the first camera module 102 and/or the second image data 132 from the second camera module 108 via, for example, the camera module interface 202 (block 2314). The parameter identifier 204 processes the image data to determine a parameter value(s) (block 2316). The parameter values may be, for example, a first luminosity, brightness or intensity value and/or a second luminosity, brightness or intensity value.

The comparator 206 accesses a reference parameter value (block 2318). The comparator 206 compares either of the first parameter value and the second parameter value and the reference parameter value to determine a difference between the first and second parameter values and the reference parameter value (block 2320).

The comparator 206 determines whether or not the difference between the determined parameter value(s) and the reference parameter value(s) satisfies a threshold to determine if object(s) is adjacent one of the lenses 104, 110 (block 2322). If the threshold is satisfied (block 2322), the camera module actuation controller 210 obtains the orientational data 126 from the orientation sensor 128 (block 2324). The camera module actuation controller 210 determines whether or not the orientation data indicates that the first lens 104 and/or the second lens 110 is facing the ground (block 2326). If one of the lenses is facing the ground (block 2326), the corresponding camera module(s) is moved to the retracted position by the camera module actuation controller 210 initiating the first control signal 125 to the first actuator 116 to cause the first camera module 102 to be retracted and/or the camera module position controller 114 and/or the second control signal 130 to the first actuator 118 causing the second camera module 108 to be retracted (block 2308). At block 2328, control returns to block 2302 or ends.

FIG. 23 is a block diagram of an example processor platform 2400 capable of executing the instructions of FIGS. 22 and/or 23 to implement the camera module position controller 114 of FIG. 2. The processor platform 2400 can be, for example, a mobile device (e.g., a cell phone, a smart phone, a tablet such as an iPad™), a personal digital assistant (PDA) or any other type of computing device. In this example, processor 2412 implements the parameter identifier 204, the comparator 206, the camera status sensor 117 and/or a camera module actuation controller 210.

The processor platform 2400 of the illustrated example includes a processor 2412. The processor 2412 of the illustrated example is hardware. For example, the processor 2412 can be implemented by one or more integrated circuits, logic circuits, microprocessors or controllers from any desired family or manufacturer.

The processor 2412 of the illustrated example includes a local memory 2413 (e.g., a cache). The processor 2412 of the illustrated example is in communication with a main memory including a volatile memory 2414 and a non-volatile memory 2416 via a bus 2418. The volatile memory 2414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2416 may be implemented by flash memory and/or any other desired type of memory device. Access to the main memory 2414, 2016 is controlled by a memory controller.

The processor platform 2400 of the illustrated example also includes an interface circuit 2420. The interface circuit 2420 may be implemented by any type of interface standard, such as an Ethernet interface, a universal serial bus (USB), and/or a PCI express interface. In this example, the camera module interface 202 and the actuator interface 212 are implemented by the interface 2420.

In the illustrated example, one or more input devices 2422 are connected to the interface circuit 2420. The input device(s) 2422 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2424 are also connected to the interface circuit 2420 of the illustrated example. The output devices 2424 can be implemented, for example, by display devices (e.g., a light emitting diode (LED), an organic light emitting diode (OLED), a liquid crystal display, a touchscreen, a tactile output device, a printer and/or speakers). The interface circuit 2420 of the illustrated example, thus, typically includes a graphics driver card, a graphics driver chip or a graphics driver processor.

The interface circuit 2420 of the illustrated example also includes a communication device such as a transmitter, a receiver, a transceiver, a modem and/or network interface card to facilitate exchange of data with external machines (e.g., computing devices of any kind) via a network 2426 (e.g., an Ethernet connection, a digital subscriber line (DSL), a telephone line, coaxial cable, a cellular telephone system, etc.).

The processor platform 2400 of the illustrated example also includes one or more mass storage devices 2428 for storing software and/or data. Examples of such mass storage devices 2428 include floppy disk drives, hard drive disks, compact disk drives, Blu-ray disk drives, RAID systems, and digital versatile disk (DVD) drives.

The coded instructions 2432 of FIGS. 22 and 23 may be stored in the mass storage device 2428, in the volatile memory 2414, in the non-volatile memory 2416, and/or on a removable tangible computer readable storage medium such as a CD or DVD.

From the foregoing, it will be appreciated that methods, apparatus and articles of manufacture have been disclosed which proactively and/or automatically protect camera lenses in wearable and/or mobile devices by retracting them in response to environmental stimuli. Devices which may benefit from the teachings disclosed herein include watches, wristbands, armbands, glasses, goggles, headgear, headbands, etc. In some examples, the camera lenses are fish eye lenses which protrude to enable the capturing of 180-degree and/or 360-degree images and/or videos. The image data and/or video data captured using such examples may be paired and/or spliced to create 360-degree images and/or videos. The protruding camera lenses may be actuated in any suitable way such as, for example, using a dual-action voice coil.

In operation, in some examples, the camera modules may be caused to emerge from the chassis and/or housing of the mobile device to be proud of and/or extend from a surface defining an aperture in which the camera module is housed. The camera modules may independently emerge from the chassis and/or housing and/or the camera modules may move together in substantial tandem in opposite directions from one another. The lens of the camera module may move relative to the camera module and/or the camera module may move as units with their lens(es).

In some examples, when an object is identified as approaching and/or being immediately adjacent one of the camera modules and/or the lenses of the camera modules, the camera modules move to a sub-flush position within the housing to shield the lenses of and/or the camera modules themselves from being damaged by a potential impact with the object. In some examples, the camera modules are spring loaded to bias the camera modules to retracted positions within the mobile device and/or wearable device. The object may be any object that may come into contact with the camera module such as a tabletop surface, a floor and/or a branch of a tree encountered when biking and/or running.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example retractable image capture devices and methods to protect such retractable image capture devices. Further examples and combinations thereof include the following.

Example 1 is a mobile device, including a housing; a camera module including a sensor and a lens, a focal distance between the sensor and the lens being fixed, the camera module being movably mounted to the housing to move between a first position and a second position, a surface of the lens to extend past an exterior surface of the housing in the first position, the camera module to be disposed within the housing in the second position; and an actuator to actuate the camera module from the first position to the second position in response to a proximity trigger.

Example 2 includes the mobile device of example 1, wherein the proximity trigger is associated with at least one of an object being detected immediately adjacent the lens and the camera module being exposed to a vibration that satisfies a threshold.

Example 3 includes the mobile device of example 1, further including a camera module position controller to: process image data collected by the camera module to identify a first parameter value; compare the first parameter value and a second parameter value to determine a difference; compare the difference between the first parameter value and the second parameter value to a threshold to determine whether an object is immediately adjacent the lens of the camera module; and in response to the difference satisfying the threshold, retract the camera module to the second position.

Example 4 includes the mobile device of example 1, wherein the camera module is a first camera module, the sensor is a first sensor, and the lens is a first lens, further including a second camera module including a second lens and a second sensor, the first lens facing a first direction, the second lens facing a second direction opposite the first direction, wherein the actuator is to actuate at least one of the first camera module and the second camera module in response to the proximity trigger.

Example 5 includes the mobile device of example 4, wherein actuator is to independently actuate the first camera module relative to the second camera module.

Example 6 includes the mobile device of example 4, wherein the proximity trigger is associated with at least one of an object being detected immediately adjacent the first lens and the second lens.

Example 7 includes the mobile device of example 6, wherein the second camera module is mounted to move between a third position and a fourth position, a surface of the second camera module to extend past the exterior surface of the housing in the third position, the second camera module to be disposed within the housing in the fourth position.

Example 8 includes the mobile device of example 7, wherein the actuator includes a first actuator and a second actuator, the first actuator to actuate the first camera module, the second actuator to actuate the second camera module between the third position and the fourth position.

Example 8 includes the mobile device of example 7, wherein the actuator is to actuate the second camera module between the third position and the fourth position.

Example 10 includes the mobile device of claim 7, further including a first arm and a second arm, the first arm coupling the first camera module and the actuator, the second arm coupling the second camera module and the actuator.

Example 11 includes the mobile device of claim 1, wherein the camera module is a first camera module disposed on a first surface of the mobile device, and further including a second camera module and a third camera module, the second camera module and the third camera module disposed on a second surface of the mobile device.

Example 12 includes a method or protecting a camera module, including: processing, by executing an instruction with at least one processor, image data associated with a camera module to identify a first parameter value; determining, by executing an instruction with the at least one processor, whether a difference between the first parameter value and a second parameter value satisfies a threshold, the satisfying of the threshold indicative of an object being immediately adjacent a lens of the camera module; and in response to the difference satisfying the threshold, retracting the camera module.

Example 13 includes the method of example 12, wherein the second parameter value is a reference parameter value accessed from a reference database.

Example 14 includes the method of example 12, wherein the first parameter value is a first luminosity value and the second parameter value is a second luminosity value.

Example 15 includes the method of example 12, wherein the retracting of the camera module includes retracting the camera module until the lens is sub-flush relative to an exterior surface of a housing of a device in which the camera module is disposed.

Example 16 includes The method of example 12, wherein the image data is first image data, the camera module is a first camera module, and the second parameter value is determined by processing second image data associated with a second camera module.

Example 17 includes the method of example 16, wherein the lens is a first lens and the satisfying of the threshold is indicative of the object being immediately adjacent the first lens of the first camera module or immediately adjacent a second lens of the second camera module.

Example 18 includes the method of example 17, further including, in response to determining the difference satisfies the threshold, retracting the second camera module.

Example 19 includes the method of example 12, further including processing orientational data to determine a direction in which the lens of the camera module is facing, wherein the retracting of the camera module is further based on the direction that the lens of the camera module is facing.

Example 20 includes the method of example 12, wherein the image data is first image data, and further including extending the camera module to enable second image data to be obtained.

Example 21 includes the method of example 20, further including: processing, by executing an instruction with the at least one processor, the second image data to identify a third parameter value; determining, by executing an instruction with the at least one processor, a difference between the third parameter value and the second parameter value does not satisfy the threshold; and in response to the difference not satisfying the threshold, maintaining the camera module in the extended position.

Example 22 is a tangible computer-readable medium comprising instructions that, when executed, cause a processor to, at least: process image data associated with a camera module to identify a first parameter value; determine whether a difference between the first parameter value and a second parameter value satisfies a threshold, the satisfying of the threshold indicative of an object being immediately adjacent a lens of the camera module; and in response to the difference satisfying the threshold, retract the camera module.

Example 23 includes the computer-readable medium as defined in example 22, wherein the instructions, when executed, further cause the processor to access the second parameter value, wherein the second parameter value is a reference parameter value accessed from a reference database.

Example 24 includes the computer-readable medium as defined in example 21, wherein the first parameter value is a first luminosity value and the second parameter value is a second luminosity value.

Example 24 includes the computer-readable medium as defined in example 22, wherein the instructions, when executed, further cause the processor to retract the camera module until the lens is sub-flush relative to an exterior surface of a housing of a device in which the camera module is disposed.

Example 26 includes the computer-readable medium as defined in example 22, wherein the instructions, when executed, further cause the processor to determine the second parameter value by processing second image data associated with a second camera module.

Example 27 includes the computer-readable medium as defined in example 26, wherein the lens is a first lens and the satisfying of the threshold is indicative of the object being immediately adjacent the first lens of the first camera module or immediately adjacent a second lens of the second camera module.

Example 28 includes the computer-readable medium as defined in example 27, wherein the instructions, when executed, further cause the processor to, in response to determining the difference satisfies the threshold, retract the second camera module.

Example 29 includes the computer-readable medium as defined in example 22, wherein the instructions, when executed, further cause the processor to process orientational data to determine a direction in which the lens of the camera module is facing, wherein the retracting of the camera module is further based on the direction that the lens of the camera module is facing.

Example 30 includes the computer-readable medium as defined in example 22, wherein the instructions, when executed, further cause the processor to extend the camera module to enable second image data to be obtained.

Example 31 includes the computer-readable medium defined example 30, wherein the instructions, when executed, further cause the processor to: process the second image data to identify a third parameter value; determine a difference between the third parameter value and the second parameter value does not satisfy the threshold; and in response to the difference not satisfying the threshold, maintain the camera module in the extended position.

Example 32 includes a system of protecting a camera module, including means for processing image data associated with a camera module to identify a first parameter value; means for determining whether a difference between the first parameter value and a second parameter value satisfies a threshold, the satisfying of the threshold indicative of an object being immediately adjacent a lens of the camera module; and in response to the difference satisfying the threshold, means for retracting the camera module.

Example 33 includes the system as defined in example 32, wherein the second parameter value is reference parameter value accessed from a reference database.

Example 34 includes the system as defined in example 32, wherein the first parameter value is a first luminosity value and the second parameter value is a second luminosity value.

Example 35 includes the system as defined in example 32, wherein the means for retracting the camera module includes means for retracting the camera module until the lens is sub-flush relative to an exterior surface of a housing of a device in which the camera module is disposed.

Example 36 includes the system as defined in example 32, wherein the image data is first image data, the camera module is a first camera module, and the second parameter value is determined by processing second image data associated with a second camera module.

Example 37 includes the system as defined in example 36, wherein the lens is a first lens and the satisfying of the threshold is indicative of the object being immediately adjacent the first lens of the first camera module or immediately adjacent a second lens of the second camera module.

Example 38 includes the system as defined in example 37, further including means for retracting the second camera module in response to determining the difference satisfies the threshold.

Example 39 includes the system as defined in example 32, further including means for processing orientational data to determine a direction in which the lens of the camera module is facing, wherein the retracting of the camera module is further based on the direction that the lens of the camera module is facing.

Example 40 includes the system as defined in example 32, wherein the image data is first image data, further including means for extending the camera module to enable second image data to be obtained.

Example 41 includes the system as defined in example 40, further comprising: means for processing the second image data to identify a third parameter value; means for determining a difference between the third parameter value and the second parameter value does not satisfy the threshold; and in response to the difference not satisfying the threshold, means for maintaining the camera module in the extended position.

What is claimed is:

1. A mobile device, comprising:
a housing;
a camera module including a sensor and a lens, the camera module being movably mounted to the housing to move between a first position and a second position, a surface of the lens to extend past an exterior surface of the housing in the first position, the camera module to be disposed within the housing in the second position;
a comparator to determine whether a difference between a first optical parameter and a reference optical parameter satisfies an optical threshold value; and
a camera module actuation controller to, in response to the optical threshold value being satisfied, obtain orientation data, the camera module actuation controller to initiate an actuator to protect the lens by actuating the camera module from the first position to the second position in response to detecting an indication, based on the orientation data, that the lens is facing a surface.

2. The mobile device of claim 1, wherein the optical threshold value is associated with an object being detected immediately adjacent the lens.

3. The mobile device of claim 1, wherein the camera module is a first camera module, the sensor is a first sensor, and the lens is a first lens, further including a second camera module including a second lens and a second sensor, the first lens facing a first direction, the second lens facing a second direction opposite the first direction, wherein the actuator is to actuate at least one of the first camera module or the second camera module in response to an indication that at least one of the first lens or the second lens is facing the surface.

4. The mobile device of claim 3, wherein the actuator is to independently actuate the first camera module relative to the second camera module.

5. The mobile device of claim 3, wherein the optical threshold value is associated with at least one of an object being detected immediately adjacent the first lens or the second lens.

6. The mobile device of claim 3, wherein the second camera module is mounted to move between a third position and a fourth position, a surface of the second camera module to extend past the exterior surface of the housing in the third position, the second camera module to be disposed within the housing in the fourth position.

7. The mobile device of claim 6, wherein the actuator includes a first actuator and a second actuator, the first actuator to actuate the first camera module, the second actuator to actuate the second camera module between the third position and the fourth position.

8. The mobile device of claim 6, wherein the actuator is to actuate the second camera module between the third position and the fourth position.

9. The mobile device of claim 6, further including a first arm and a second arm, the first arm coupling the first camera module and the actuator, the second arm coupling the second camera module and the actuator.

10. The mobile device of claim 1, wherein the camera module is a first camera module disposed on a first surface of the mobile device, and further including a second camera module and a third camera module, the second camera module and the third camera module disposed on a second surface of the mobile device.

11. A method, comprising:
processing, by executing an instruction with at least one processor, image data associated with a camera module to identify a first optical parameter value;
determining, by executing an instruction with the at least one processor, whether a difference between the first optical parameter value and a reference optical parameter value satisfies an optical threshold value;
in response to the difference satisfying the optical threshold value, obtaining orientation data; and
in response to detecting an indication that a lens is facing a surface based on the orientation data, retracting the camera module.

12. The method of claim 11, wherein the reference optical parameter value is accessed from a reference database.

13. The method of claim 11, wherein the first optical parameter value is a first luminosity value and the reference optical parameter value is a second luminosity value.

14. The method of claim 11, wherein the retracting of the camera module includes retracting the camera module until the lens is sub-flush relative to an exterior surface of a housing of a device in which the camera module is disposed.

15. The method of claim 11, wherein the image data is first image data, the camera module is a first camera module, and a second optical parameter value is determined by processing second image data associated with a second camera module.

16. The method of claim 15, wherein the lens is a first lens and the satisfying of the optical threshold value is indicative of an object being immediately adjacent the first lens of the first camera module.

17. The method of claim 15, further including, in response to determining a second difference between the second optical parameter value and the reference optical parameter value satisfies the optical threshold value, retracting the second camera module.

18. The method of claim 11, further including processing the orientation data to determine a direction in which the lens of the camera module is facing, wherein the retracting of the camera module is further based on the direction that the lens of the camera module is facing.

19. The method of claim 11, wherein the image data is first image data, and further including extending the camera module to enable second image data to be obtained.

20. The method of claim 19, further including:
processing, by executing an instruction with the at least one processor, the second image data to identify a third optical parameter value;
determining, by executing an instruction with the at least one processor, a difference between the third optical parameter value and the reference optical parameter value does not satisfy the optical threshold value; and in response to the difference not satisfying the optical threshold value, maintaining the camera module in an extended position.

21. A tangible computer-readable medium comprising instructions that, when executed, cause a processor to, at least:

process image data associated with a camera module to identify a first optical parameter value;

determine whether a difference between the first optical parameter value and a reference optical parameter value satisfies an optical threshold value, the satisfying of the optical threshold value indicative of an object being immediately adjacent a lens of the camera module;

in response to the optical threshold value being satisfied, obtain orientation data; and in response to the orientation data being indicative of the lens facing a surface, retract the camera module.

22. The computer-readable medium as defined in claim 21, wherein the instructions, when executed, further cause the processor to access the reference optical parameter value from a reference database.

23. The computer-readable medium as defined in claim 21, wherein the first optical parameter value is a first luminosity value and the reference optical parameter value is a second luminosity value.

24. The computer-readable medium as defined in claim 21, wherein the instructions, when executed, further cause the processor to retract the camera module until the lens is sub-flush relative to an exterior surface of a housing of a device in which the camera module is disposed.

\* \* \* \* \*